United States Patent
Hashimoto et al.

(10) Patent No.: US 8,654,227 B2
(45) Date of Patent: Feb. 18, 2014

(54) FOCUS DETECTION APPARATUS, FOCUS DETECTION METHOD, AND IMAGE SENSING APPARATUS

(75) Inventors: Yoshitaka Hashimoto, Yokohama (JP); Akihiko Nagano, Ichihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 268 days.

(21) Appl. No.: 13/061,727

(22) PCT Filed: Nov. 4, 2009

(86) PCT No.: PCT/JP2009/069148
§ 371 (c)(1),
(2), (4) Date: Mar. 2, 2011

(87) PCT Pub. No.: WO2010/055835
PCT Pub. Date: May 20, 2010

(65) Prior Publication Data
US 2011/0164165 A1 Jul. 7, 2011

(30) Foreign Application Priority Data

Nov. 14, 2008 (JP) ................................. 2008-292609

(51) Int. Cl.
*H04N 3/14* (2006.01)
*H04N 5/335* (2011.01)
(52) U.S. Cl.
USPC ........... 348/294; 348/298; 348/302; 348/308; 348/312
(58) Field of Classification Search
USPC ......... 348/302, 308, 362–364, 335, 340, 345, 348/348; 250/208.1; 396/89, 93
See application file for complete search history.

(56) References Cited

U.S. PATENT DOCUMENTS

| | | | |
|---|---|---|---|
| 4,410,804 A | 10/1983 | Stauffer | |
| 5,367,153 A | 11/1994 | Suda et al. | |
| 7,095,441 B2 | 8/2006 | Nagano | |
| 7,474,352 B2 | 1/2009 | Oikawa | |
| 7,652,713 B2 | 1/2010 | Yamasaki | |
| 2004/0179128 A1 | 9/2004 | Oikawa | |

FOREIGN PATENT DOCUMENTS

JP  58-024105 A  2/1983

(Continued)

OTHER PUBLICATIONS

Dec. 15, 2009 International Search Report and Written Opinion in International Patent Appln. No. PCT/JP2009/069148.

*Primary Examiner* — Yogesh Aggarwal
(74) *Attorney, Agent, or Firm* — Fitzpatrick, Cella, Harper & Scinto

(57) ABSTRACT

A focus detection apparatus includes: an image sensor that has a first pixel group which receives a luminous flux passing a first pupil area of an imaging optical system, and a second pixel group which receives a luminous flux passing a second pupil area different from the first pupil area; a storage unit that stores first and second distribution functions corresponding to the first and second pupil areas, respectively; a calculation unit that generates a first image signal by performing calculations on a first subject image, obtained from the first pixel group, using the second distribution function, and generates a second image signal by performing calculations on a second subject image, obtained from the second pixel group, using the first distribution function; and a focus state detection unit that detects a focus state of the imaging optical system based on the first and the second image signals.

12 Claims, 19 Drawing Sheets

(56) References Cited

FOREIGN PATENT DOCUMENTS

| | | |
|---|---|---|
| JP | 4-267211 A | 9/1992 |
| JP | 5-127073 A | 5/1993 |
| JP | 5-127074 A | 5/1993 |
| JP | 9-046596 A | 2/1997 |
| JP | 2959142 B2 | 10/1999 |
| JP | 2004-191629 A | 7/2004 |
| JP | 2005-106994 A | 4/2005 |

PLAN VIEW

A-A SECTIONAL VIEW

PLAN VIEW

B-B SECTIONAL VIEW

C-C SECTIONAL VIEW

PLAN VIEW

F I G. 17A
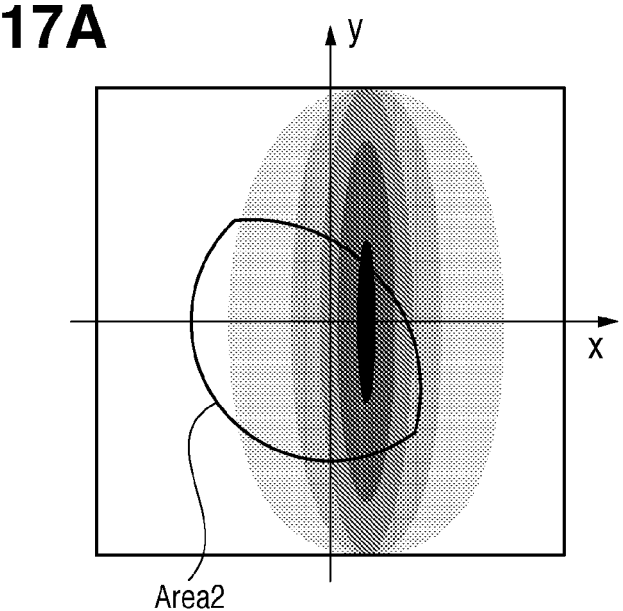
F I G. 17B
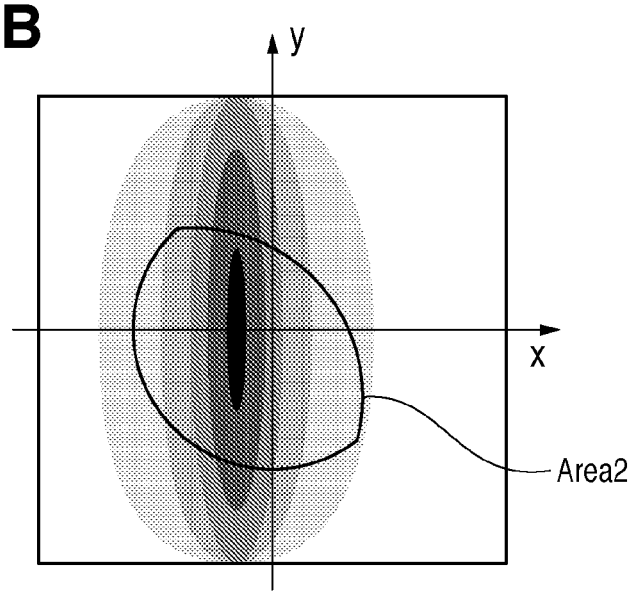
F I G. 18
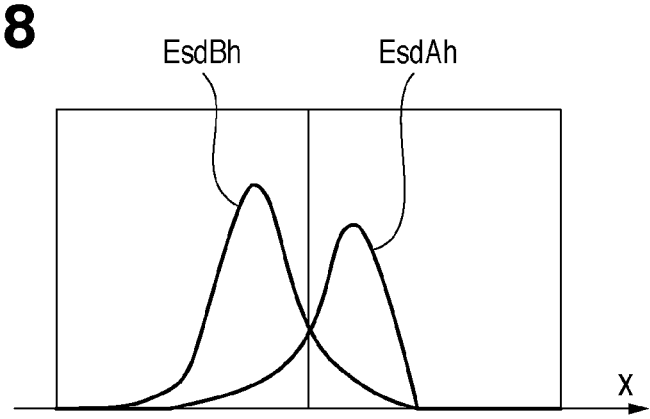

F I G. 19A
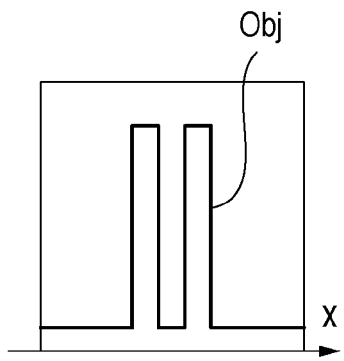
F I G. 19B
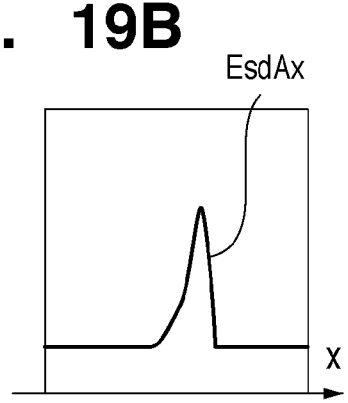
F I G. 19C
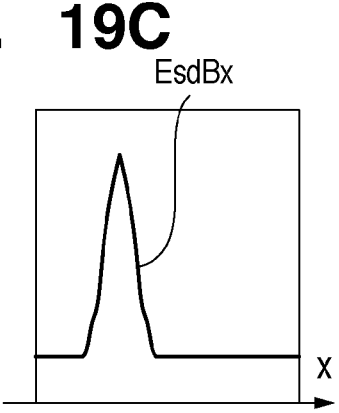
F I G. 19D
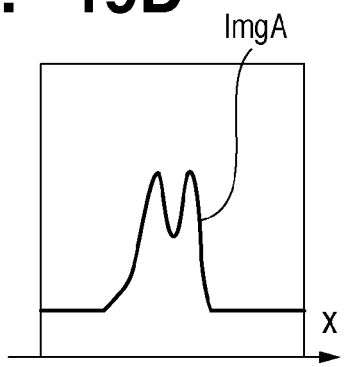
F I G. 19E
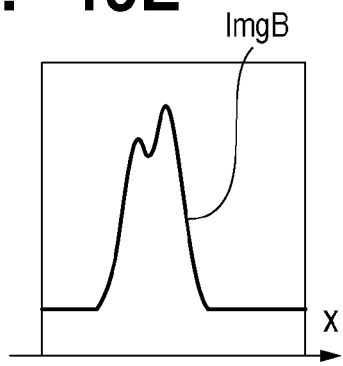
F I G. 19F
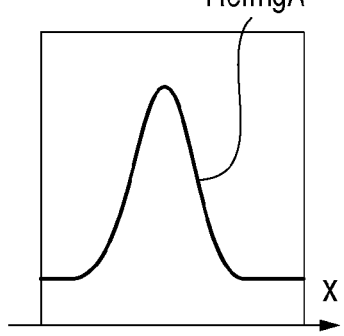
F I G. 19G
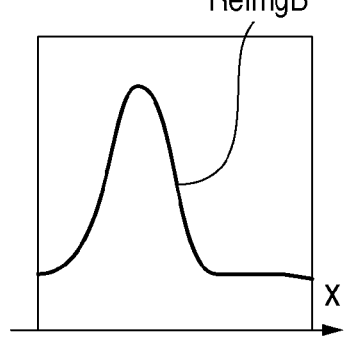

FOCUS DETECTION APPARATUS, FOCUS DETECTION METHOD, AND IMAGE SENSING APPARATUS

TECHNICAL FIELD

The present invention relates to a focus detection apparatus, a focus detection method, and an image sensing apparatus, and more particularly, to a focus detection apparatus and a focus detection method used in an image sensing apparatus, such as a digital still camera, capable of detecting an in-focus state of a photographing lens based on an image obtained from an image sensor for image sensing.

BACKGROUND ART

Regarding systems for detecting an in-focus state of a photographing lens in a digital camera that photographs using an image sensor, an apparatus that performs pupil division-based focus detection using a two-dimensional sensor is disclosed in Japanese Patent Laid-Open No. 58-24105, where the two-dimensional sensor has a microlens formed in each pixel. In the apparatus disclosed in Japanese Patent Laid-Open No. 58-24105, a photoelectric converter in each pixel of the image sensor is divided into multiple parts and the divided photoelectric converter is configured to receive a luminous flux passing different areas of a pupil of the photographing lens via the microlens.

Also, Japanese Patent No. 2959142 discloses a solid-state image sensing apparatus that combines an image sensor and in which pixels are arranged two-dimensionally with the relative position of a microlens and a photoelectric converter shifted. The solid-state image sensing apparatus disclosed in Japanese Patent No. 2959142 detects the in-focus state of the photographing lens based on images generated in pixel columns that differ in the relative shift direction of the microlens and the photoelectric converter. On the other hand, when capturing an ordinary image, the solid-state image sensing apparatus generates an image by adding signals from pixels that differ in the relative shift direction of the microlens and the photoelectric converter.

Also, in Japanese Patent Laid-Open No. 2005-106994, the present inventor discloses a solid-state image sensing apparatus that performs pupil division-based focus detection using a CMOS image sensor (solid-state image sensing apparatus) used in a digital still camera. With the solid-state image sensing apparatus disclosed in Japanese Patent Laid-Open No. 2005-106994, in some of a large number of pixels in the solid-state image sensing apparatus, the photoelectric converter is divided into two parts to detect focus state of the photographing lens. The photoelectric converter is configured to receive a luminous flux passing a predetermined area of a pupil of the photographing lens via the microlens.

FIG. 22 is an explanatory diagram illustrating a distribution of light received by a pixel that performs focus detection and is located at the center of a solid-state image sensor disclosed in Japanese Patent Laid-Open No. 2005-106994. FIG. 22 shows areas on the pupil of the photographing lens from which the two parts of the divided photoelectric converter can receive light. In FIG. 22, a circle represents an exit pupil of the photographing lens. White areas Sα and Sβ are the areas from which the two parts of the divided photoelectric converter can receive light. Normally, the two areas are set to be symmetric with respect to an optical axis of the photographing lens (intersection of an x axis and y axis in FIG. 22).

Cameras detect the focus state of the photographing lens using a correlation calculation between an image generated by a luminous flux passing through the area Sα and an image generated by a luminous flux passing through the area Sβ on the pupil of the photographing lens. A method for detecting focus using a correlation calculation between images generated by a luminous flux passing through different pupil areas of a photographing lens is disclosed in Japanese Patent Laid-Open No. 5-127074.

Also, Japanese Patent Laid-Open No. 5-127074 discloses a technique for detecting the focus state after deforming a specific filter contained in a camera according to an aperture ratio, an exit pupil position, and an amount of image displacement and adapting the deformed filter to a subject image.

When detecting the focus state, it is common practice to detect the focus of not only a subject located at the center of a photographic screen, but also subjects located on peripheries of the photographic screen. However, on the peripheries of the photographic screen, the areas Sα and Sβ on the pupil of the photographing lens become asymmetric because of vignetting of a luminous flux caused by a lens frame or the like of the photographing lens. This results in low agreement between the image generated by the luminous flux passing through the area Sα on the pupil of the photographing lens and the image generated by the luminous flux passing through the area Sβ on the pupil of the photographing lens. Thus, the inventions disclosed in Japanese Patent Laid-Open No. 58-24105, Japanese Patent No. 2959142, and Japanese Patent Laid-Open No. 2005-106994 have a problem in that accurate focus detection is not possible on the peripheries of the photographic screen if a correlation calculation is performed based on the image generated by the luminous flux passing through the area Sα on the pupil of the photographing lens and the image generated by the luminous flux passing through the area Sβ on the pupil of the photographing lens.

Also, the technique disclosed in Japanese Patent Laid-Open No. 5-127074 has the disadvantage that images cannot be restored according to vignetting state of the luminous flux even if the specific filter contained in the camera is deformed according to conditions.

DISCLOSURE OF INVENTION

The present invention has been made in consideration of the above situation, and has as its object to enable restoring images according to vignetting state of a luminous flux and thereby improve focusing accuracy.

According to the present invention, the foregoing object is attained by providing a focus detection apparatus comprising: image sensing means having a first pixel group which receives a luminous flux passing a first pupil area of an imaging optical system which forms a subject image, and a second pixel group which receives a luminous flux passing a second pupil area different from the first pupil area; storage means storing a first distribution function corresponding to the first pupil area, and a second distribution function corresponding to the second pupil area; calculation means generating a first image signal by performing calculations on a first subject image, obtained from the first pixel group, using the second distribution function, and generating a second image signal by performing calculations on a second subject image, obtained from the second pixel group, using the first distribution function; and focus state detection means detecting a focus state of the imaging optical system based on the first image signal and the second image signal generated by the calculation means.

According to the present invention, the foregoing object is also attained by providing a focus detection method comprising: an image sensing step of reading a first subject image from a first pixel group which receives a luminous flux passing a first pupil area of an imaging optical system which forms a subject image, and reading a second subject image from a second pixel group which receives a luminous flux passing a second pupil area different from the first pupil area, the first pixel group and the second pixel group being included in image sensing means; an acquisition step of acquiring a first distribution function corresponding to the first pupil area, and a second distribution function corresponding to the second pupil area; a calculation step of generating a first image signal by performing calculations on the first subject image using the second distribution function and generating a second image signal by performing calculations on the second subject image using the first distribution function; and a focus state detection step of detecting a focus state of the imaging optical system based on the first image signal and the second image signal generated in the calculation step.

Further features of the present invention will become apparent from the following description of exemplary embodiments (with reference to the attached drawings).

BRIEF DESCRIPTION OF DRAWINGS

FIGS. 17A and 17B are diagrams showing vignetting on the pupil surfaces of pixels which has an image height from the center of the image sensor;

FIG. 18 is a diagram one-dimensionally showing pupil-intensity distributions of an incident luminous flux on the pupil surfaces of the pixels that has an image height from the center of the image sensor;

FIGS. 19A to 19G are conceptual diagrams illustrating a filtering process used to solve asymmetry of subject images, according to the embodiment of the present invention;

BEST MODE FOR CARRYING OUT THE INVENTION

Preferred embodiments of the present invention will be described in detail in accordance with the accompanying drawings. The dimensions, shapes and relative positions of the constituent parts shown in the embodiments should be changed as convenient depending on various conditions and on the structure of the apparatus adapted to the invention, and the invention is not limited to the embodiments described herein.

Figure 1:
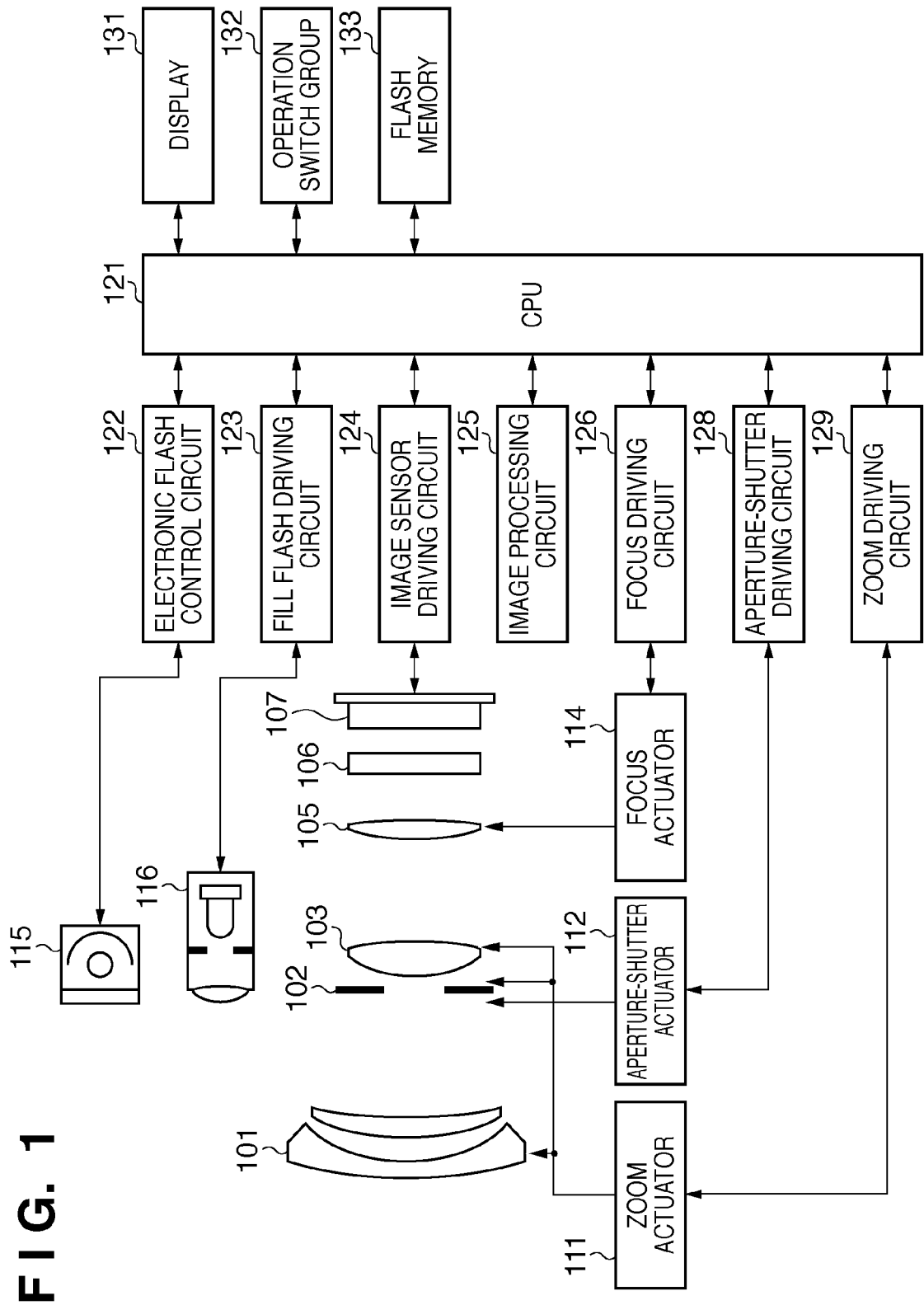
FIG. 1 is a block diagram showing a configuration of a camera according to an embodiment of the present invention.

FIG. 1 is a block diagram of an image sensing apparatus according to a preferred embodiment of the present invention, showing an electronic camera made up of a camera body containing an image sensor, and a photographic optical system integral with the camera body. In FIG. 1, reference numeral 101 denotes a first lens group placed at the distal end of the photographic optical system (imaging optical system), being held in such a way as to be able to move forward and backward along an optical axis. Reference numeral 102 denotes an aperture-shutter which has capabilities to adjust an amount of light during shooting through adjustment of an aperture diameter and an adjust exposure time (in fractions of a second) during still image shooting. Reference numeral 103 denotes a second lens group. The aperture-shutter 102 and the second lens group 103 move forward and backward integrally along an optical axis, and perform a scaling operation (zoom function) in conjunction with forward and backward movement of the first lens group 101.

Reference numeral 105 denotes a third lens group that performs focus adjustment by moving forward and backward along the optical axis. Reference numeral 106 denotes an optical low pass filter, which is an optical element used to reduce false colors and moire in shot images. Reference numeral 107 denotes an image sensor, which includes a CMOS image sensor and peripheral circuits of the CMOS image sensor. The image sensor 107 uses a two-dimensional single-plate color sensor that has multiple light-receiving pixels, with m pixels arranged in a horizontal direction and n pixels arranged in a vertical direction, over which a Bayer array of primary-color mosaic filters is formed on chip.

Reference numeral 111 denotes a zoom actuator that turns a cam barrel (not shown) and thereby drives the first lens group 101 and second lens group 103 forward and backward along the optical axis, to perform a scaling operation. Reference numeral 112 denotes an aperture-shutter actuator which adjusts an amount of photographic light by controlling the aperture diameter of the aperture-shutter 102 and controls the exposure time during still photography. Reference numeral 114 denotes a focus actuator which performs focus adjustment by moving the third lens group 105 forward and backward along the optical axis.

Reference numeral 115 denotes an electronic flash used to illuminate a subject at the time of photography. A flash lighting system that uses a xenon tube is used preferably, but a lighting system equipped with a LED that emits light successively may be used alternatively. Reference numeral 116 denotes an AF fill flash unit that projects an image of a mask provided with a predetermined open pattern to a subject field via a projection lens to improve focus-detection capability with respect to a dark subject or low-contrast subject.

Reference numeral 121 denotes a CPU that performs various types of control over the camera body in the image sensing apparatus. The CPU 121 includes, for example, a calculation unit, a ROM, a RAM, an A/D converter, a D/A converter, and a communications interface circuit. Based on a predetermined program stored in the ROM, the CPU 121 performs a series of operations including AF, shooting, image processing, and recording operations by driving a various circuits of the image sensing apparatus.

Reference numeral 122 denotes an electronic flash control circuit which performs lighting control of the electronic flash 115 in synchronization with a shooting operation. Reference numeral 123 denotes a fill flash driving circuit which performs lighting control of the AF fill flash unit 116 in synchronization with a focus detection operation. Reference numeral 124 denotes an image sensor driving circuit which controls an image sensing operation of the image sensor 107 as well as performs A/D conversion of an acquired image signal and transmits the resulting image signal to the CPU 121. Reference numeral 125 denotes an image processing circuit which performs y conversion, color interpolation, JPEG compression, and other processes on an image acquired by the image sensor 107.

Reference numeral 126 denotes a focus driving circuit which controls driving of the focus actuator 114 based on results of focus detection, thereby moving the third lens group 105 forward and backward along the optical axis, and thereby performing focus adjustment. Reference numeral 128 denotes an aperture-shutter driving circuit that controls driving of the aperture-shutter actuator 112 and thereby controls opening of the aperture-shutter 102. Reference numeral 129 denotes a zoom driving circuit which drives the zoom actuator 111 in response to a zoom operation performed by a photographer.

Reference numeral 131 denotes a display, such as an LCD, which displays information about a shooting mode of the image sensing apparatus, a preview image before shooting and a confirmation image after shooting, an in-focus state display image brought up when focus is detected, and the like. Reference numeral 132 denotes an operation switch group, which includes a power switch, a release (shutter trigger) switch, a zoom operation switch, a shooting mode selector switch, and the like. Reference numeral 133 denotes a detachable flash memory used to record shot images.

Figure 2:
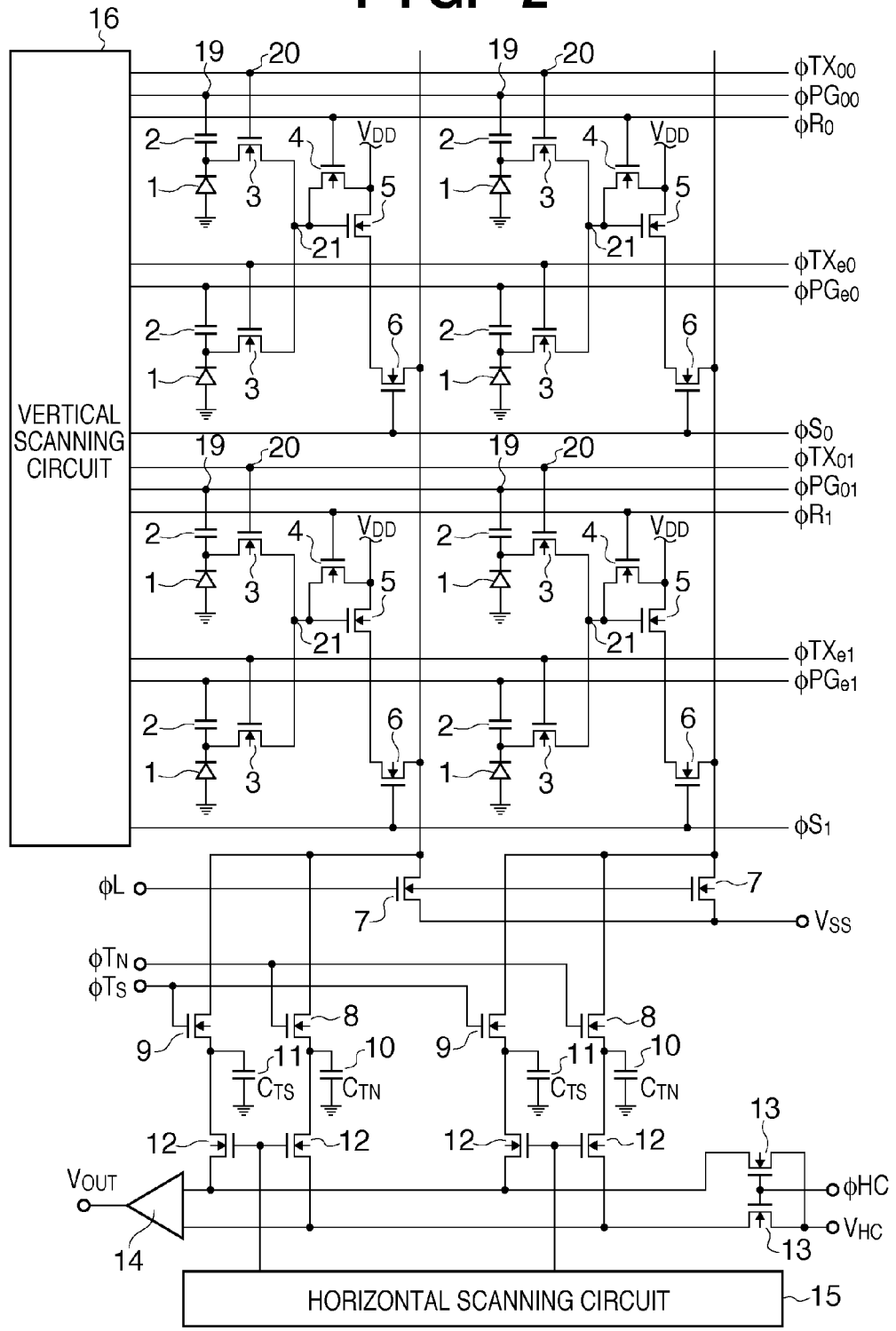
FIG. 2 is a circuit diagram showing an exemplary configuration of an image sensor according to the embodiment of the present invention.

FIG. 2 is a circuit diagram showing a schematic configuration of the image sensor 107 according to the present embodiment which can suitably use, for example, a technique disclosed in Japanese Patent Laid-Open No. 09-046596 and the like by the present inventor. Although FIG. 2 shows a range covering 2 columns×4 rows of pixels in a two-dimensional CMOS area sensor, actually a large number of pixels, such as shown in FIG. 2, are arranged to obtain high-resolution images. Incidentally, according to the present embodiment, it is assumed that the image sensor has a pixel pitch of 2 μm, an effective pixel count of 3000 columns wide×2000 rows high for a total of 600 million pixels, and an image sensing screen size of 6 mm wide×4 mm high.

In FIG. 2, reference numeral 1 denotes a photoelectric converter of a photoelectric conversion device which includes a MOS transistor gate and a depletion layer under the gate, reference numeral 2 denotes a photogate, reference numeral 3 denotes a transfer switch MOS transistor, and reference numeral 4 denotes a reset MOS transistor. Reference numeral 5 denotes a source follower amplifier MOS transistor, reference numeral 6 denotes a horizontal selector switch MOS transistor, and reference numeral 7 denotes a source follower load MOS transistor. Reference numeral 8 denotes a dark signal transfer MOS transistor, reference numeral 9 denotes an image signal transfer MOS transistor, reference numeral 10 denotes a dark signal storage capacitor $C_{TN}$, and reference numeral 11 denotes an image signal storage capacitor $C_{TS}$. Reference numeral 12 denotes a horizontal transfer MOS transistor, reference numeral 13 denotes a horizontal output line reset MOS transistor, reference numeral 14 denotes a differential amplifier, reference numeral 15 denotes a horizontal scanning circuit, and reference numeral 16 denotes a vertical scanning circuit.

Figure 3:
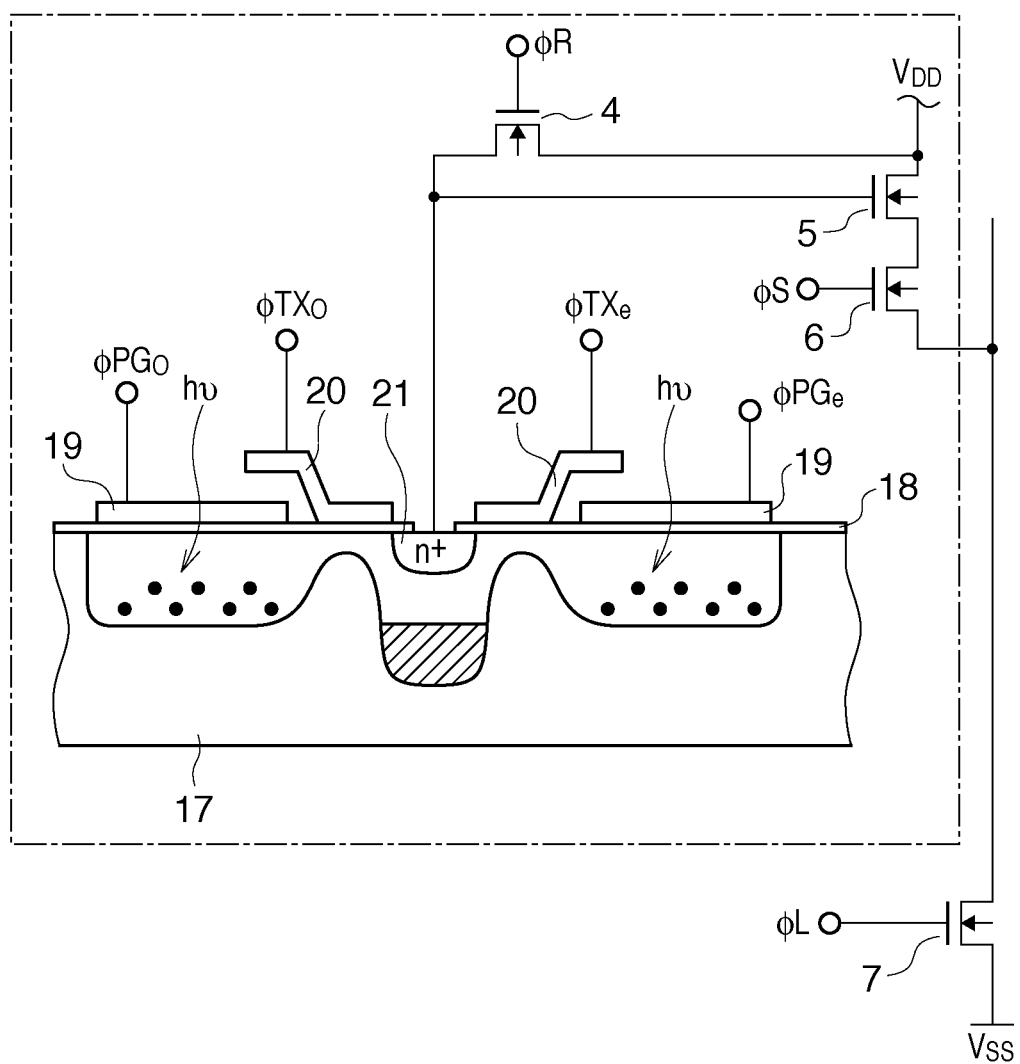
FIG. 3 is a sectional view of a wired portion which spans two pixels of the image sensor according to the embodiment of the present invention.

FIG. 3 is a sectional view of a wired portion which spans two pixels in the Y direction in FIG. 2. In FIG. 3, reference numeral 17 denotes a p-type well, reference numeral 18 denotes a gate oxide film, reference numeral 19 denotes a first polysilicon layer, reference numeral 20 denotes a second polysilicon layer, and reference numeral 21 denotes an n+ floating diffusion (FD) portion. The FD portion 21 is connected with two photoelectric converters via two transfer MOS transistors. In FIG. 3, drains of two transfer switch MOS transistors 3 and the FD portion 21 are shared to improve sensitivity through capacitance reduction of the FD portion 21 and miniaturization. However, the FD portion 21 may be connected by aluminum (Al) wiring.

Figure 4:
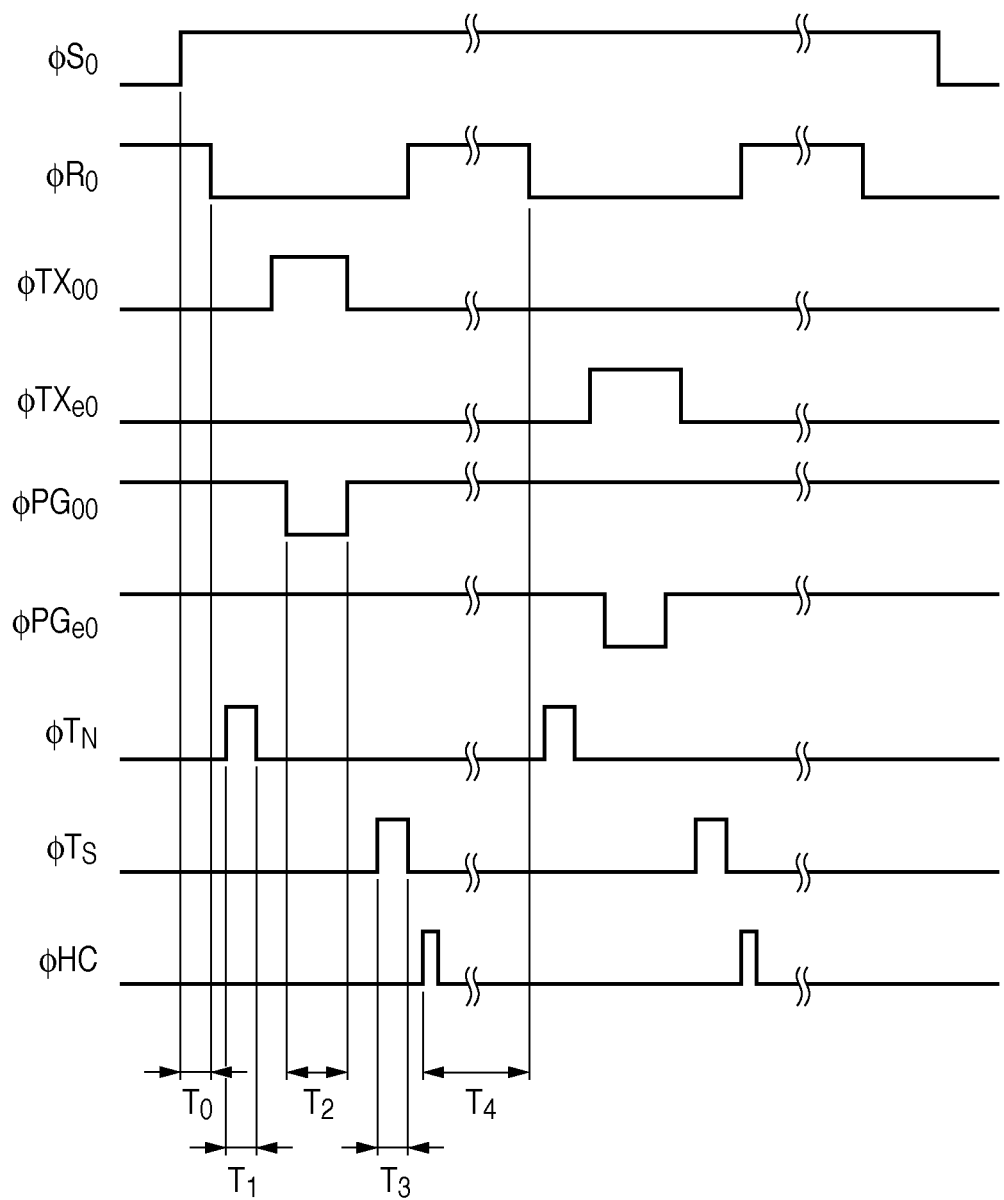
FIG. 4 is a timing chart for driving the image sensor according to the embodiment of the present invention.

Next, operation of independent outputs from all pixels in the image sensor 107 shown in FIGS. 2 and 3 will be described with reference to a timing chart in FIG. 4.

First, in response to a timing output from the vertical scanning circuit 16, a control pulse φL is set High to reset a vertical output line. Also, control pulses $φR_0$, $φPG_{00}$, and $φPG_{e0}$ are set High to turn on the reset MOS transistor 4 and set the first polysilicon layer 19 of the photogate 2 to High. At time $T_0$, a control pulse $φS_0$ is set High to turn on the horizontal selector switch MOS transistor 6 and thereby select the pixels on the first and second lines. Next, the control pulse $φR_0$ is set Low to release the FD portion 21 from reset state and put the FD portion 21 into floating state and thereby cause the source follower amplifier MOS transistor 5 to conduct between gate and source. Subsequently, at time $T_1$, a control pulse $φT_N$ is set High to cause the FD portion 21 to output a dark voltage to the storage capacitor $C_{TN}$ 10 through source follower operation.

Next, in order to obtain photoelectric conversion outputs from the pixels of the first line, a control pulse $φTX_{00}$ for the first line is set High to bring the transfer switch MOS transistor 3 into conduction. After that, at time $T_2$, the control pulse $φPG_{00}$ is set Low. In so doing, a preferably voltage relationship is such as to shallow potential wells, which are spread below the photogate 2, and completely transfer light-generating carriers to the FD portion 21. Thus, as long as complete transfer is possible, a fixed potential may be used instead of the control pulse φTX.

At time $T_2$, as charge is transferred from the pixels of the first line of a photodiode to the FD portion 21, the potential of the FD portion 21 changes according to light. Since the source follower amplifier MOS transistor 5 is in a floating state, a control pulse φ$T_S$ is set High at time $T_3$ to output the potential of the FD portion 21 to the storage capacitor $C_{TS}$ 11. At this point, a dark signal and image signal of the pixels of the first line are stored in the storage capacitors $C_{TN}$ 10 and $C_{TS}$ 11, respectively. At time $T_4$, a control pulse φHC is temporarily set High to bring the horizontal output line reset MOS transistor 13 into conduction. Consequently, a horizontal output line is reset, causing the dark signal and the image signal of the pixels to be output to the horizontal output line in a horizontal transfer period in response to a scan timing signal for the horizontal scanning circuit 15. In so doing, by determining the differential output $V_{OUT}$ using the differential amplifier 14 for the storage capacitors $C_{TN}$ 10 and $C_{TS}$ 11, it is possible to obtain a signal free of random pixel noise and fixed-pattern noise and with a good signal-to-noise ratio.

The dark signal and the image signal of the pixels of the first line are stored, respectively, in the storage capacitors $C_{TN}$ 10 and $C_{TS}$ 11 connected to respective vertical output lines. Thus, when the horizontal transfer MOS transistors 12 are turned on in sequence, the charges stored in the respective storage capacitors $C_{TN}$ 10 and $C_{TS}$ 11 are read out to the horizontal output line in sequence and output from the differential amplifier 14.

The present embodiment is configured to produce the differential output $V_{OUT}$ in the chip. However, similar effects can be obtained using a conventional external CDS (Correlated Double Sampling) circuit outside the chip.

On the other hand, after the image signal is output from the pixels of the first line to the storage capacitors $C_{TS}$ 11, the control pulse φ$R_0$ is set High to bring the reset MOS transistor 4 into conduction and reset the FD portion 21 to a power supply voltage $V_{DD}$. When horizontal transfer of charges from the first line is finished, charges are read out from pixels on the second line. To read the second line, a control pulse φ$TX_{e0}$ and control pulse φ$PG_{e0}$ are driven first, as in the case of the first line described above. Next, the control pulses φ$T_N$ and φ$T_S$ are sequentially set High, and the dark signal and image signal are stored in the respective storage capacitors $C_{TN}$ 10 and $C_{TS}$ 11.

The above process allows the first line and the second line to be read independently of each other. Subsequently, if the (2n+1)-th and (2n+2)-th lines (n=1, 2, . . . ) are read similarly by operating the vertical scanning circuit 16, independent outputs can be produced from all pixels. Specifically, when n=1, first a control pulse φ$S_1$ is set High, then φ$R_1$ is set Low, and subsequently control pulses φ$T_N$ and φ$TX_{01}$ are set High. Then, a control pulse φ$PG_{01}$ is set Low, the control pulse φ$T_S$ is set High, and the control pulse φHC is temporarily set High to read the dark signal and the image signal from each pixel of the third line. Next, control pulses φ$TX_{e1}$ and φ$PG_{e1}$ are applied in addition to the control pulses described above to read the dark signal and the image signal from each pixel of the fourth line.

FIGS. 5A to 7B are diagrams illustrating structures of image-sensing pixels and focus-detection pixels. The present embodiment uses a Bayer array in which, out of 4 pixels in 2 rows×2 columns, 2 pixels having G (green) spectral sensitivity are arranged diagonally, the remaining 2 pixels being a pixel having R (red) spectral sensitivity and a pixel having B (blue) spectral sensitivity. Besides, focus-detection pixels of a structure described later are arranged among the pixels in the Bayer array.

Figure 5B:
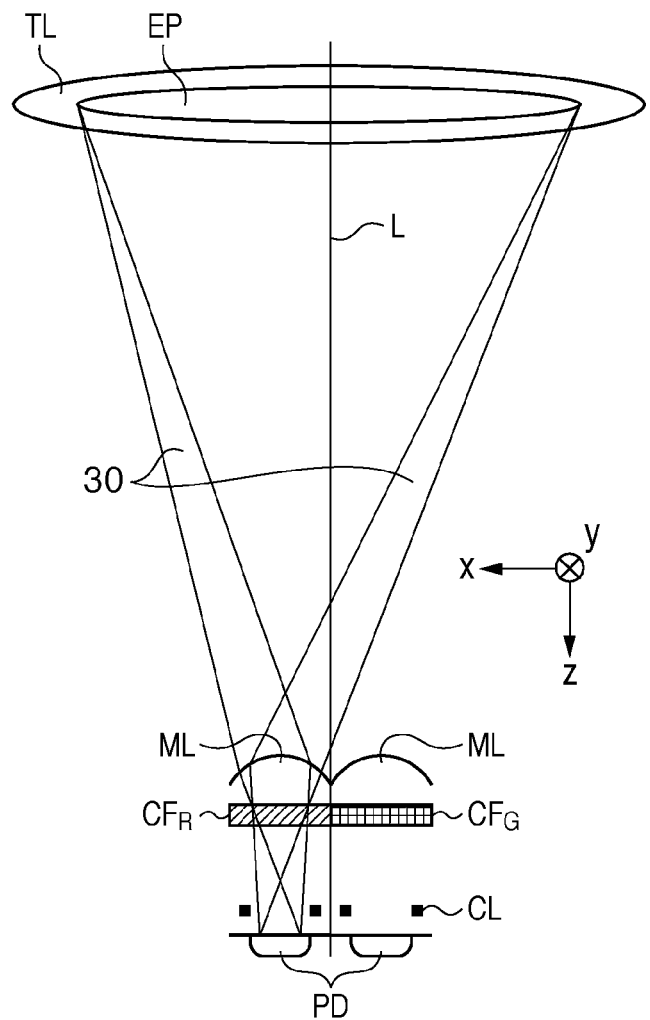
FIGS. 5A and 5B are diagrams illustrating a structure of image-sensing pixels according to the embodiment of the present invention.
Figure 5A:
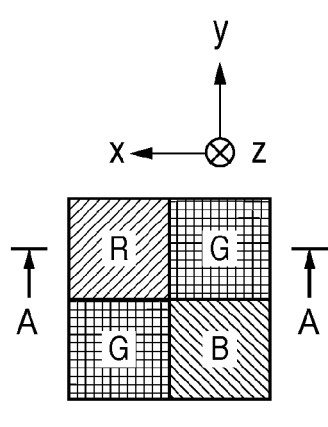

FIGS. 5A and 5B show an arrangement and structure of image sensing pixels. FIG. 5A is a plan view of image-sensing pixels in 2 rows×2 columns. As is well known, in a Bayer array, G pixels are arranged diagonally, the remaining two pixels being an R pixel and B pixel. The structure of 2 rows×2 columns is arranged in a repetitive fashion.

A sectional view taken along A-A in FIG. 5A is shown in FIG. 5B. Reference character ML denotes an on-chip microlens placed at the forward end of each pixel, reference character $CF_R$ denotes an R (red) color filter, and reference character $CF_G$ denotes a G (green) color filter. Reference character PD (which stands for Photo Diode) schematically represents the photoelectric conversion device of the image sensor 107. Reference character CL (which stands for Contact Layer) denotes a wiring layer containing signal lines used to transmit various signals in the image sensor 107. Reference character TL (which stands for Taking Lens) schematically represents the photographing lens 100. Reference character L denotes an optical axis of the photographing lens TL. Incidentally, FIGS. 5A and 5B show pixels near the center of the image sensor 107, that is, a pixel structure near the optical axis L of the photographing lens TL.

The on-chip microlens ML of the image sensing pixel and the photoelectric conversion device PD are configured to capture luminous fluxes passing the photographing lens TL as effectively as possible. In other words, the exit pupil EP of the photographing lens TL and the photoelectric conversion device PD are conjugated via the microlens ML. Also, the effective area of the photoelectric conversion device PD is designed to be large. This can be seen from a luminous flux 30, which shows how the entire area of the exit pupil EP is taken into the photoelectric conversion device PD. Although a luminous flux incident upon the R pixel has been described in FIG. 5B, the G pixel and B (blue) pixel have the same structure. In this way, the exit pupil EP for each of the image sensing RGB pixels has a large diameter to efficiently capture the luminous fluxes from the subject and improve the signal-to-noise ratio of the image signal.

Figure 6B:
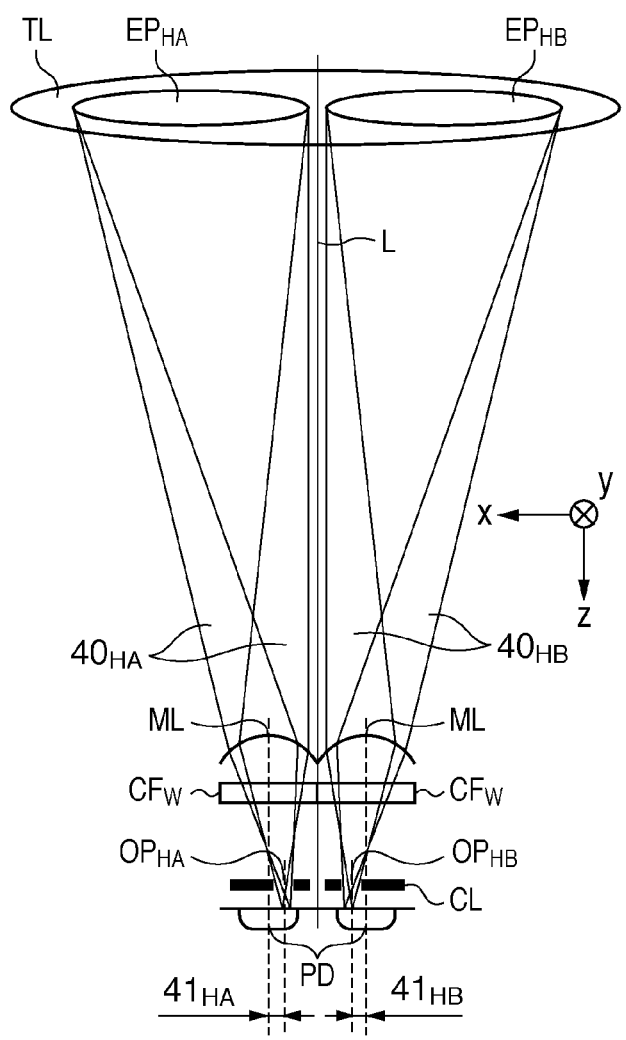
FIGS. 6A and 6B are a plan view and sectional view, respectively, illustrating a structure of focus-detection pixels used for pupil division in a horizontal direction of a photographing lens according to the embodiment of the present invention.
Figure 6A:
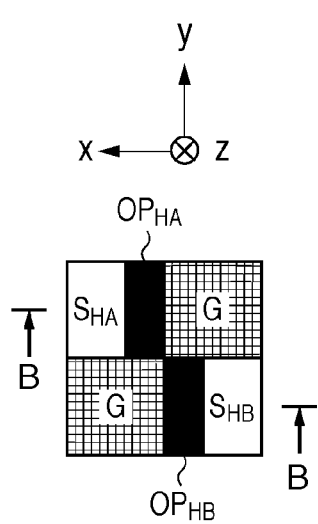

FIGS. 6A and 6B are a plan view and sectional view of focus-detection pixels used for pupil division in an x direction of the photographing lens TL in FIGS. 6A and 6B. FIG. 6A is a plan view of 2 rows×2 columns of pixels including the focus-detection pixels. To obtain an image signal for recording or observation, G pixels are used to acquire a main component of luminance information. This is because man's image-recognition characteristics, which are sensitive to luminance information, tend to perceive image-quality degradation when G pixels are deficient. On the other hand, even if the R pixels or B pixels, which are used to acquire color information (color-difference information), are more or less deficient, image-quality degradation is hard to recognize because man's visual characteristics are somewhat insensitive to color information. Thus, according to the present embodiment, out of 2 rows×2 columns of pixels, the R and B pixels are replaced by focus-detection pixels at a certain rate while retaining the G pixels as image sensing pixels. The focus-detection pixels shown as a pair in FIG. 6A are denoted by $S_{HA}$ and $S_{HB}$.

A sectional view taken along B-B in FIG. 6A is shown in FIG. 6B. The microlens ML and photoelectric conversion device PD have the same structure as the image sensing pixel shown in FIG. 5B. FIGS. 6A and 6B also show pixels near the center of the image sensor 107, that is, the pixel structure near the optical axis L of the photographing lens TL.

According to the present embodiment, since signals from the focus-detection pixels are not used for image formation, a transparent film $CF_W$ (white) is placed instead of a color separation color filter. Also, since the image sensor 107 performs pupil division, an opening of the wiring layer CL deviates to the center line of the microlens ML in the x direction. Specifically, an opening $OP_{HA}$ of the pixel $S_{HA}$ deviates to the center line of the microlens ML by $41_{HA}$ in the −x direction, and thus receives a luminous flux $40_{HA}$ passing an exit pupil area $EP_{HA}$ in the +x direction of the photographing lens TL. Similarly, an opening $OP_{HB}$ of the pixel $S_{HE}$ deviates to the center line of the microlens ML by $41_{HB}$ in the +x direction, and thus receives a luminous flux $40_{HB}$ passing an exit pupil area $EP_{HB}$ in the −x direction of the photographing lens TL. As can be seen from FIG. 6B, the amount of deviation $41_{HA}$ is equal to the amount of deviation $41_{HB}$.

The pixels $S_{HA}$ configured as described above are arranged regularly in the x direction and a subject image obtained from this pixel group is designated as image A. Also, the pixels $S_{HB}$ are arranged regularly in the x direction and a subject image obtained from this pixel group is designated as image B. Then, by detecting relative position of images A and B thus acquired, it is possible to detect a defocus amount of a subject image that has a luminance distribution in the x direction.

Incidentally, the pixels $S_{HA}$ and $S_{HB}$ described above are useful in detecting the focus with respect to a subject that has a luminance distribution in the x direction of a photographic screen, such as a line in a y direction (vertical line), for example, but are not useful in detecting the focus with respect to a line in the x direction (horizontal line) that has a luminance distribution in the y direction. Thus, to enable focus detection with respect to a line in the x direction as well, the present embodiment is also provided with pixels used for pupil division in the y direction of the photographing lens.

Figure 7B:
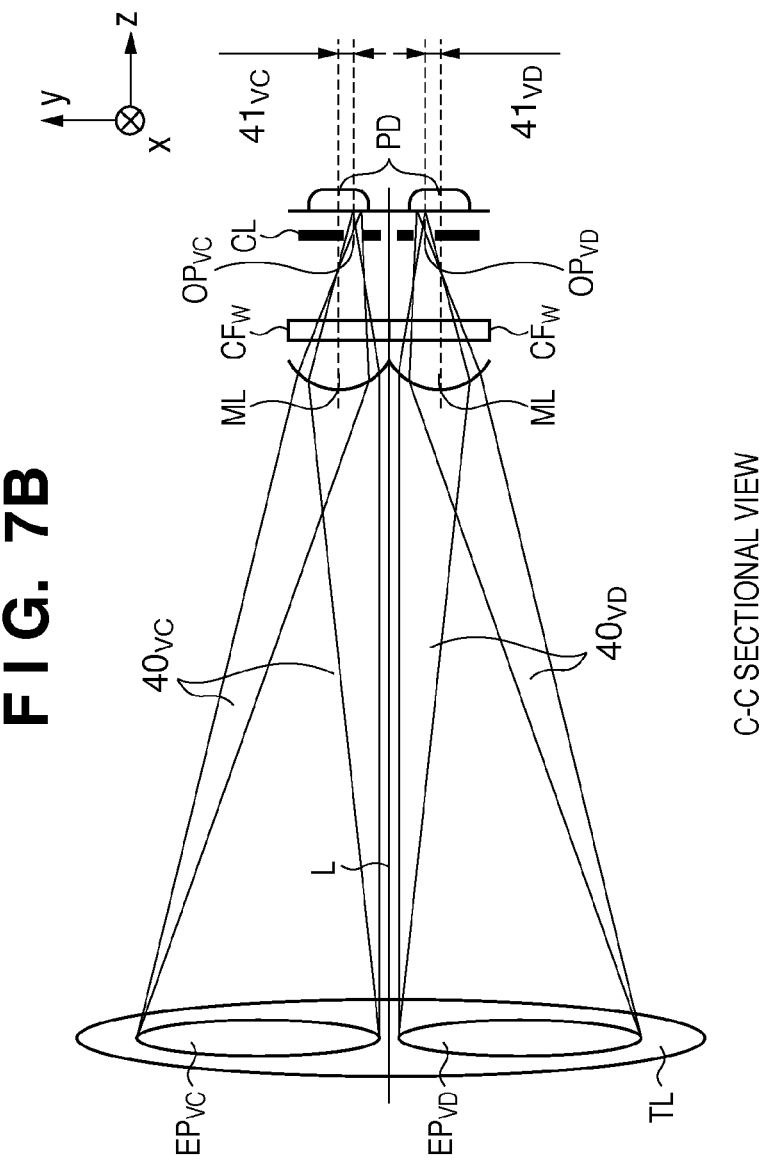
FIGS. 7A and 7B are a plan view and sectional view, respectively, illustrating a structure of focus-detection pixels used for pupil division in a vertical direction of the photographing lens according to the embodiment of the present invention.
Figure 7A:
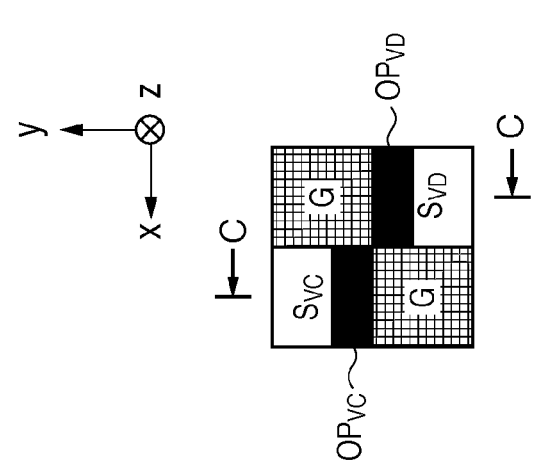

FIGS. 7A and 7B are a plan view and sectional view of focus-detection pixels used for pupil division in the y direction of the photographing lens TL in FIGS. 7A and 7B. FIG. 7A is a plan view of 2 rows×2 columns of pixels, including focus-detection pixels, near the center of the image sensor 107, that is, near the optical axis L of the photographing lens TL. As in the case of FIG. 6A, the R and B pixels are replaced by focus-detection pixels at a certain rate while retaining the G pixels as image sensing pixels. The focus-detection pixels shown as a pair in FIG. 7A are denoted by $S_{VC}$ and $S_{VD}$.

A sectional view taken along C-C in FIG. 7A is shown in FIG. 7B. While with the pixels shown in FIG. 6B, the pupil is separated in the x direction, with the pixels shown in FIG. 7B, the pupil is separated in the y direction, but the pixel structure is the same. That is, an opening $OP_{VC}$ of the pixel $S_{VC}$ deviates to the center line of the microlens ML by $41_{VC}$ in the −y direction, and thus receives a luminous flux $40_{VC}$ passing an exit pupil area $EP_{VC}$ in the +y direction of the photographing lens TL. Similarly, an opening $OP_{VD}$ of the pixel $S_{VD}$ deviates to the center line of the microlens ML by $41_{VD}$ in the +y direction, and thus receives a luminous flux $40_{VD}$ passing an exit pupil area $EP_{VD}$ in the −y direction of the photographing lens TL.

The pixels $S_{VC}$ configured as described above are arranged regularly in the y direction and a subject image obtained from this pixel group is designated as image C. Also, the pixels $S_{VD}$ are arranged regularly in the y direction and a subject image obtained from this pixel group is designated as image D. Then, by detecting the relative position of images C and D thus acquired, it is possible to detect a defocus amount of a subject image that has a luminance distribution in the y direction.

Figure 8:
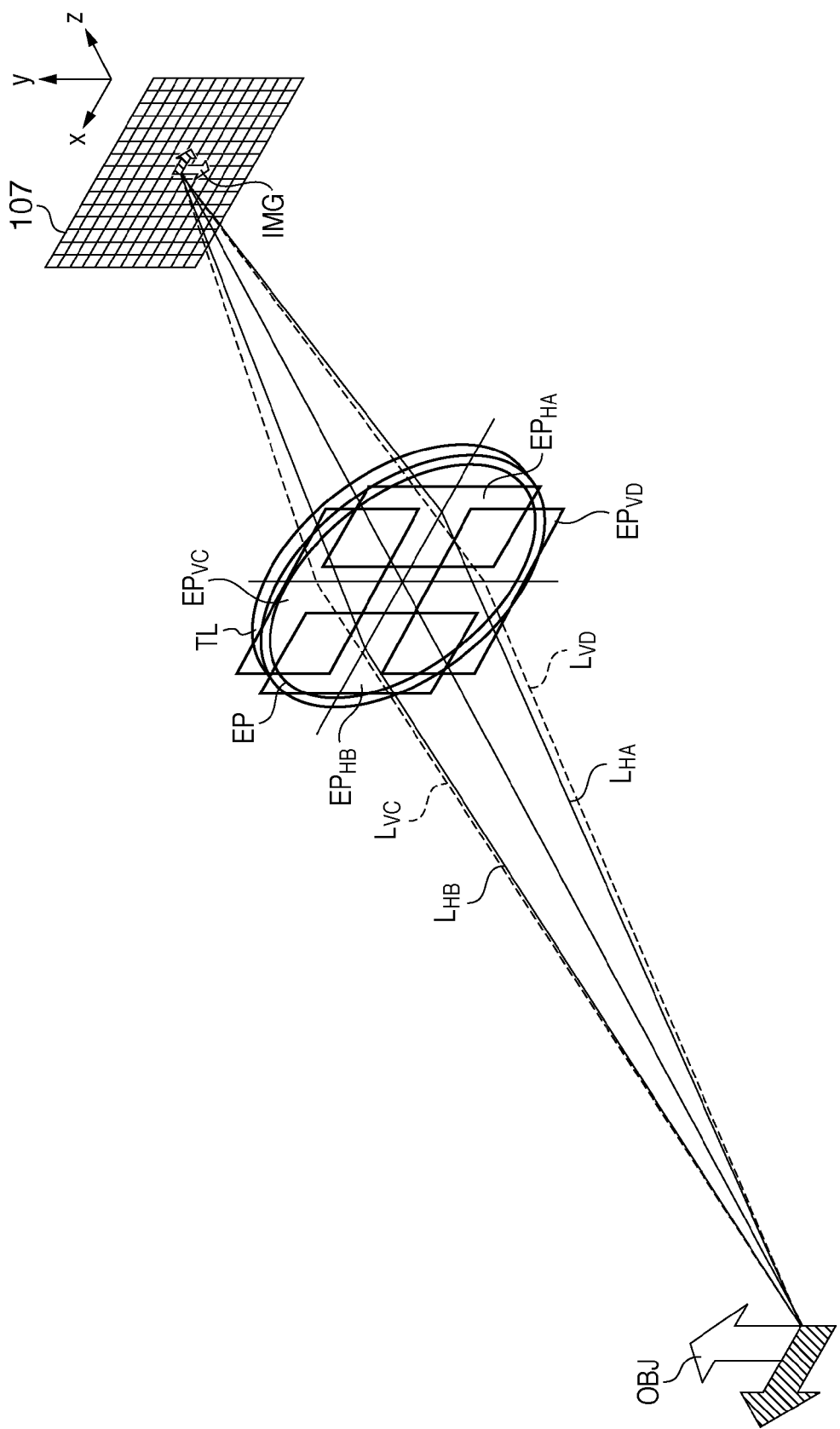
FIG. 8 is a diagram conceptually illustrating a pupil-division function of the focus-detection pixels according to the embodiment of the present invention.

FIG. 8 is a diagram conceptually illustrating a pupil-division function of the focus-detection pixels in the image sensor 107. In FIG. 8, the same components as those in FIGS. 5A to 7B are denoted by the same reference numerals/characters as the corresponding components in FIGS. 5A to 7B. Reference character OBJ denotes a subject and a reference character IMG denotes a subject image.

As described with reference to FIGS. 5A and 5B, the image-sensing pixels receive the luminous flux passing the entire area of the exit pupil EP of the photographing lens TL. On the other hand, as described with reference to FIGS. 6A, 6B, 7A, and 7B, the focus-detection pixels have a pupil-division function. Specifically, the pixel $S_{HA}$ shown in FIGS. 6A and 6B receives a luminous flux $L_H$, passing the +x side of the pupil, that is, a luminous flux passing the exit pupil area $EP_{HA}$ in FIG. 8. Similarly, the pixels $S_{HE}$, $S_{VC}$, and $S_{VD}$ receive luminous fluxes passing the exit pupil areas $EP_{HB}$, $EP_{VC}$, and $EP_{VD}$, respectively. The focus-detection pixels include pairs of pixels $S_{HA}$ and $S_{HB}$ for detection of x-direction deviation and pairs of pixels $S_{VC}$ and $S_{VD}$ for detection of y-direction deviation, which are arranged at uniform density over an entire image sensing area. To detect the x-direction deviation, a pair of image signals obtained from the pairs of pixels $S_{HA}$ and $S_{HB}$ for detection of x-direction deviation are used as AF pixel signals for calculation of a phase difference. Also, to detect the y-direction deviation, a pair of image signals obtained from the pairs of pixels $S_{VC}$ and $S_{VD}$ for detection of y-direction deviation are used as AF pixel signals for calculation of the phase difference. This configuration makes it possible to detect focus at any location in the image sensing area based on x-direction and y-direction phase differences.

Figure 9:
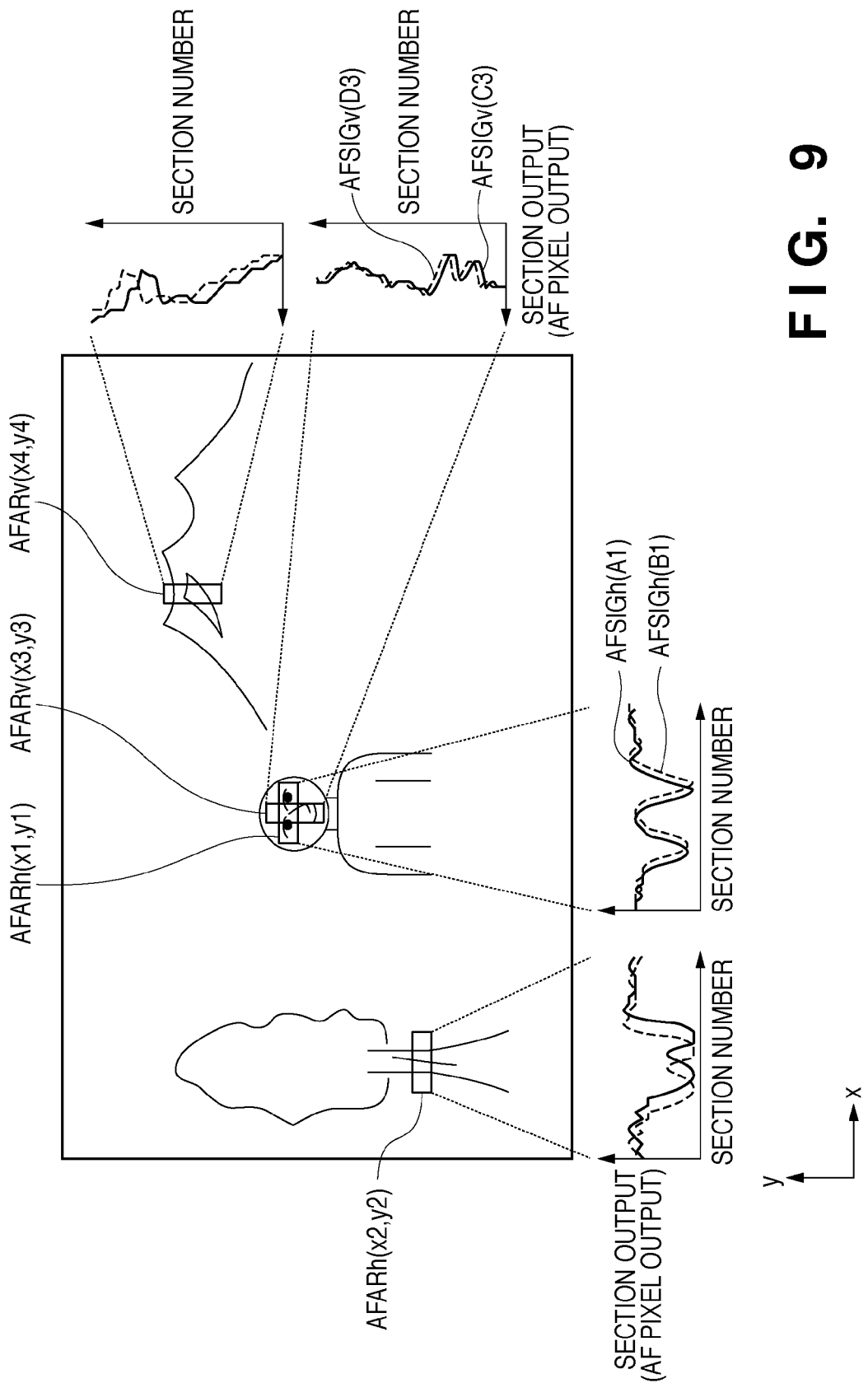
FIG. 9 is a diagram illustrating a focus-detection area in an image acquired during focus detection according to the embodiment of the present invention.

FIG. 9 is a diagram illustrating a focus-detection area and an image acquired during focus detection. In FIG. 9, a subject image formed on an image-sensing surface contains a person shown near the center, a close-range tree shown on the left, and distant mountains shown on the right.

In FIG. 9, the face of the person is shown in the center of the screen. Once a face is detected using a known face recognition technique, a focus-detection area AFARh (x1, y1) for detection of x-direction deviation and focus-detection area AFARv (x3, y3) for detection of y-direction deviation are set centering around a face region, where the subscript h represents the x direction, the subscript v represents the y direction, and (x1, y1) and (x3, y3) represent coordinates in the upper left corner of the focus-detection areas. A signal of image A for phase-difference detection obtained by connecting signals from the pixels $S_{HA}$ for detection of x-direction deviation contained in sections of the focus-detection area AFARh (x1, y1) over 30 sections is denoted by AFSIGh (A1). Similarly, a signal of image B for phase-difference detection obtained by connecting signals from the pixels $S_{HB}$ for detection of x-direction deviation over 30 sections is denoted by AFSIGh (B1). Then, by calculating an amount of relative x-direction deviation between the signal AFSIGh of image A (A1) and signal AFSIGh of image B (B1) using a known correlation calculation, it is possible to determine an defocus amount of the photographing lens.

Regarding the focus-detection area AFARv (x3, y3), by calculating an amount of relative y-direction deviation of a isignal of image C AFSIGv (C1) for phase-difference detection and a signal of image D AFSIGh (D1) for phase-difference detection using a known correlation calculation, a defocus amount of the photographing lens is determined similarly. Then, the two defocus amounts detected in the x-direction and y-direction focus-detection areas are compared, and the value with the higher reliability is adopted.

On the other hand, the trunk of the tree on the left side of the screen mainly contains a y-direction component, that is, it has a luminance distribution in the x direction. Therefore, it is determined that the subject is suitable for detecting x-direction deviation, and a focus-detection area AFARh (x2, y2) for detection of x-direction deviation is set. Also, ridges of the mountains on the right side of the screen mainly contain an x-direction component, that is, it has a luminance distribution in the y direction. Therefore, it is determined that the subject is suitable for detecting y-direction deviation, and a focus-detection area AFARv (x4, y4) for detection of y-direction deviation is set.

Thus, the present embodiment, which can set focus-detection areas for detection of x-direction deviation and y-direction deviation at any location, is always capable of focus detection even if projected position of the subject or directionality of luminance distribution has wide variations. Principles of deviation detection will be described below. Principles for the x direction and y direction are identical except for the difference in direction, and thus only the deviation detection in the x direction will be described, and description of deviation detection in the y direction will be omitted.

Figure 10A:
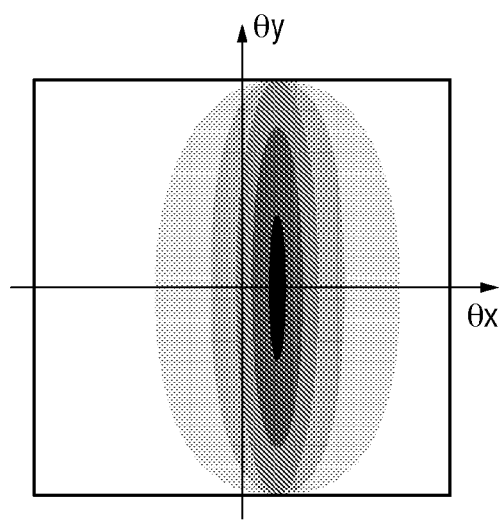
FIGS. 10A and 10B are schematic diagrams showing incident-angle characteristics of focus-detection pixels at the center of the image sensor according to the embodiment of the present invention.
Figure 10B:
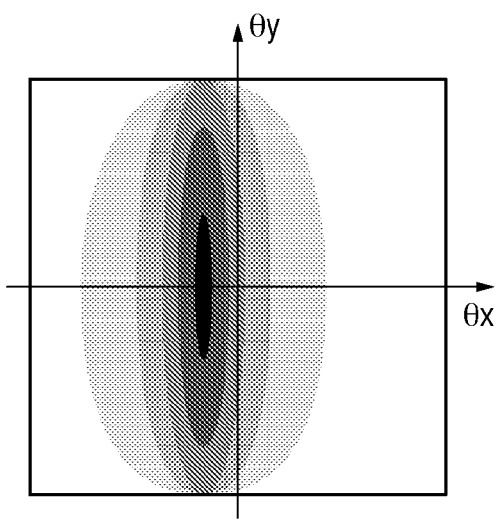

FIGS. 10A and 10B are schematic diagrams showing incident-angle characteristics of focus-detection pixels at the center of the image sensor 107, where FIG. 10A shows characteristics of the pixel $S_{HA}$ and FIG. 10B shows characteristics of the pixel $S_{HB}$. In FIGS. 10A and 10B, a θx axis and θy axis represent x-direction and y-direction incident angles of the pixels, respectively. In FIGS. 10A and 10B, darker colors represent higher intensity of light received. In FIGS. 6A and 6B, for ease of explanation, the exit pupil of the pixel $S_{HA}$ and exit pupil of the pixel $S_{HB}$ are denoted by $EP_{HA}$ and $EP_{HB}$, respectively, and shown as being completely separated. Actually, however, as shown in FIGS. 10A and 10B, the exit pupils of the pixels $S_{HA}$ and $S_{HB}$ partially overlap each other due to the effects of diffraction at the openings $OP_{HA}$ and $OP_{HB}$ and for the purpose of improvement in the signal-to-noise ratio.

Figure 11:
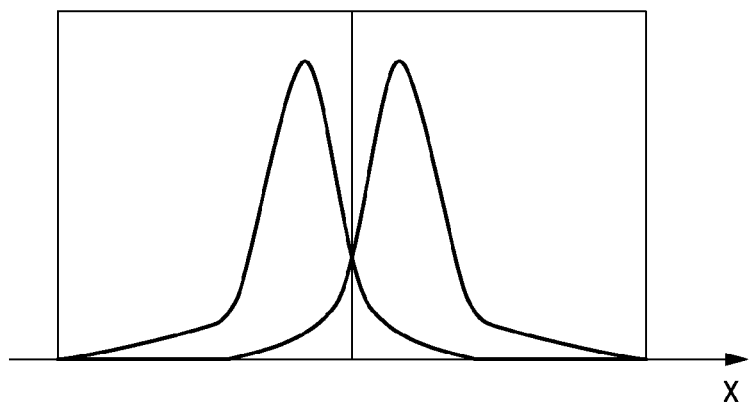
FIG. 11 is a diagram one-dimensionally showing the incident angle characteristics of the focus-detection pixels shown in FIGS. 10A and 10B.

FIG. 11 is a diagram one-dimensionally showing the incident-angle characteristics of the focus-detection pixels. The abscissa represents the incident angle, the ordinate represents the sum of photosensitivity values in the θy direction in FIGS. 10A and 10B, and the origin represents the optical axis L. As shown in FIG. 11, the incident-angle characteristics of the focus-detection pixels $S_{HA}$ and $S_{HB}$ at the center of the image sensor 107 are approximately symmetric with respect to the optical axis L.

Figure 12A:
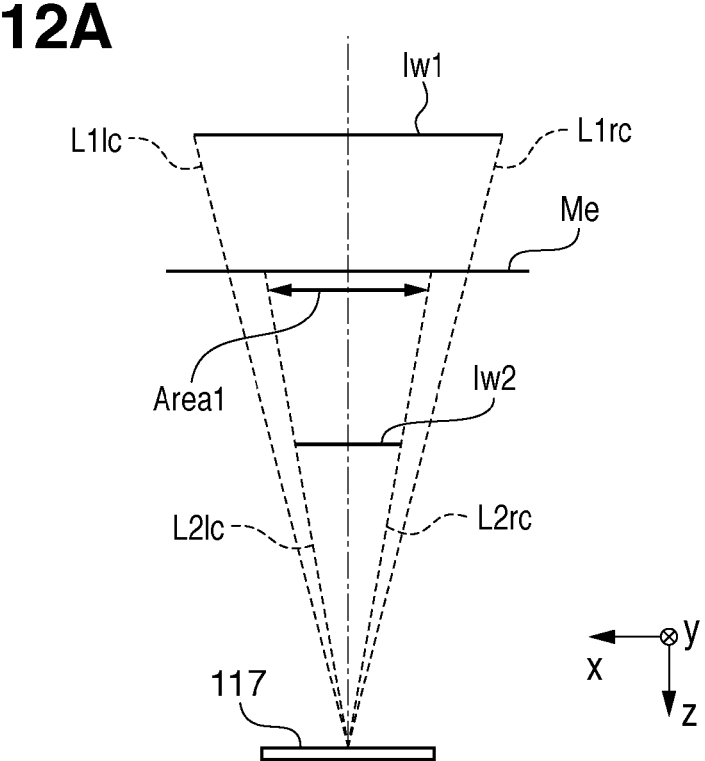
FIGS. 12A and 12B are diagrams illustrating vignetting of luminous fluxes.
Figure 12B:
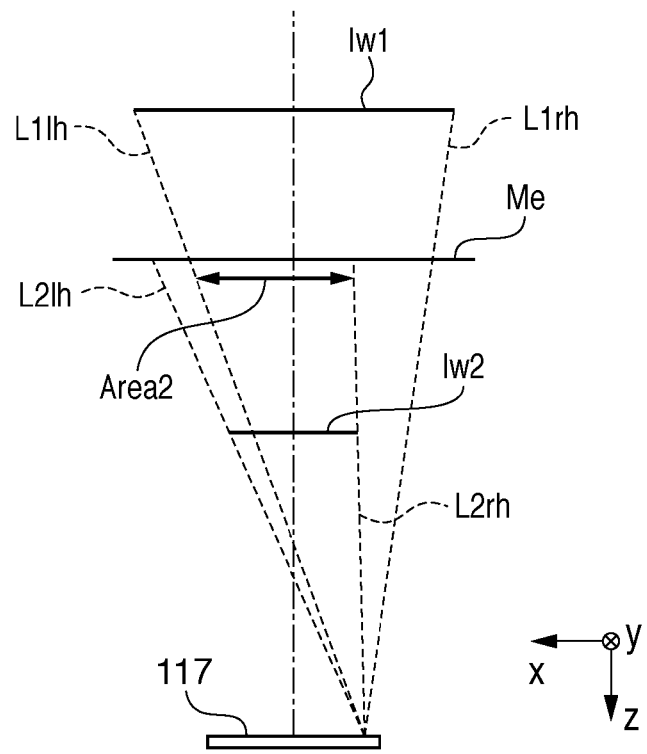

FIGS. 12A and 12B are diagrams illustrating vignetting of luminous fluxes. FIG. 12A shows a luminous flux incident upon a pixel at the center of the image sensor 107, while FIG. 12B shows a luminous flux incident upon a pixel that has an image height from the center of the image sensor 107. A luminous flux restricted by some components, including a lens holding frame of the photographing lens TL and the aperture-shutter 102, is incident upon the image sensor 107. For simplicity of explanation, it is assumed here that at any image height, there are two members that restrict the luminous flux.

Reference characters Iw1 and Iw2 denote windows of the members that restrict the luminous flux. The luminous flux passes the windows Iw1 and Iw2 of the members. Reference character Me denotes a pupil surface established according to the configuration of the microlens ML. First, vignetting of the luminous flux incident upon the pixel at the center of the image sensor 107 will be described with reference to FIG. 12A.

Reference characters L1rc and L1lc denote an outer circumference of an exit luminous flux from the window Iw1, where L1rc indicates the right end of the circumference in FIG. 12A and L1lc indicates the left end of the circumference in FIG. 12A. Reference characters L2rc and L2lc denote an outer circumference of an exit luminous flux from the window Iw2 as the outer circumference is projected to pupil position of the microlens ML, where L2rc indicates the right end of the circumference in FIG. 12A and L2lc indicates the left end of the circumference in FIG. 12A. As shown in FIG. 12A, on the pupil surface Me, the pupil area of the luminous flux incident upon the center pixel of the image sensor 107 is represented by the luminous flux having the outer circumference L2lc and L2rc, that is, represented by an arrow Area1.

Next, vignetting of the luminous flux incident upon the pixel which has an image height from the center of the image sensor 107 will be described with reference to FIG. 12B. Reference characters L1rh and L1lh denote an outer circumference of an exit luminous flux from the window Iw1, where L1rh indicates the right end of the circumference in FIG. 12B and L1lh indicates the left end of the circumference in FIG. 12B. Reference characters L2rh and L2lh denote an outer circumference of an exit luminous flux from the window Iw2 as the outer circumference is projected to pupil position of the microlens ML, where L2rh indicates the right end of the circumference in FIG. 12B and L2lh indicates the left end of the circumference in FIG. 12B. As shown in FIG. 12B, on the pupil surface Me, the pupil area of the luminous flux incident upon the pixel which has an image height from the center of the image sensor 107 is represented by the luminous flux having the outer circumference L1lh and L2rh, that is, represented by an arrow Area2.

Figure 13A:
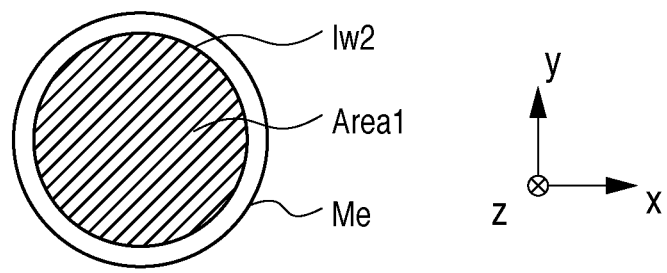
FIGS. 13A and 13B are diagrams showing pupil areas on pupil surfaces.
Figure 13B:
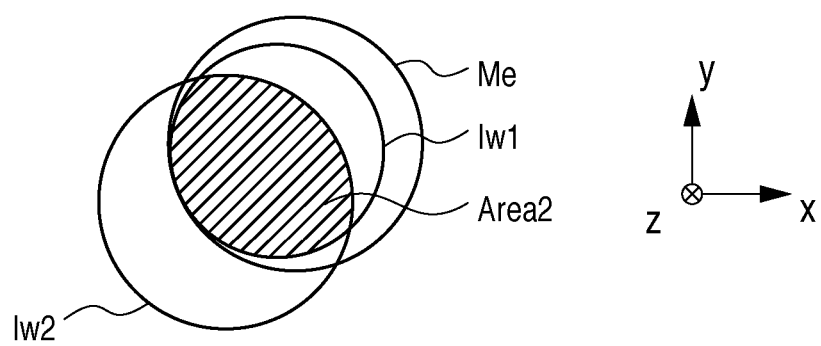

FIGS. 13A and 13B are diagrams showing pupil areas on pupil surfaces Me. FIG. 13A shows the pupil area of the pixel at the center of the image sensor 107 and FIG. 13B shows the pupil area of the pixel which has an image height from the center of the image sensor 107. As described with reference to FIGS. 12A and 12B, since the luminous flux restricted only by the window Iw2 enters the pixel at the center of the image sensor 107, the shape of the window Iw2 is projected as it is onto the pupil area Area1 as shown in FIG. 13A. Since the window that restricts the luminous flux is circular in shape, so is the pupil area Area1. On the other hand, since the luminous flux restricted by Iw1 and Iw2 enter the pixel that has an image height from the center of the image sensor 107, the pupil area Area2 has a shape shown in FIG. 13B.

Figure 14A:
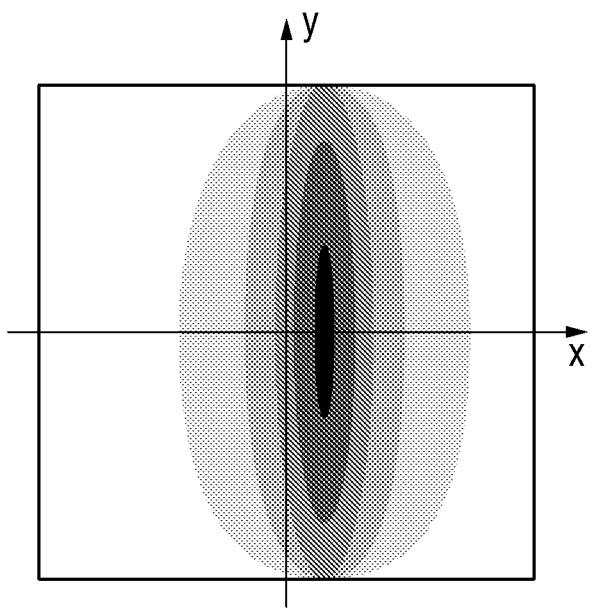
FIGS. 14A and 14B are diagrams showing pupil-intensity distributions of focus-detection pixels.
Figure 14B:
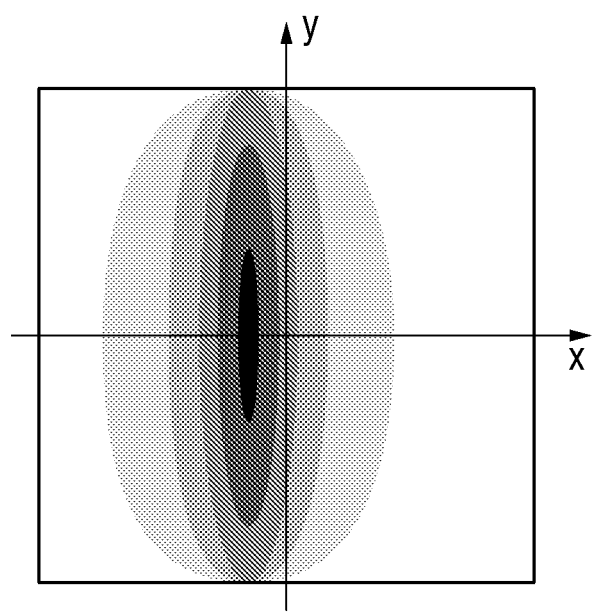

FIGS. 14A and 14B are diagrams showing pupil-intensity distributions of focus-detection pixels. The diagrams are projections of the incident-angle characteristics of the focus-detection pixels at the center of the image sensor 107 shown in FIGS. 10A and 10B onto the pupil of the microlens ML, where FIG. 14A shows characteristics of the pixel $S_{HA}$ and FIG. 14B shows characteristics of the pixel $S_{HB}$. In FIGS. 14A and 14B, the ordinate and abscissa are mapped to coordinates on the pupil. The characteristics of the pupil-intensity distributions are the same for the pixel which has an image height from the center of the image sensor 107. This is because the microlens ML of the pixel located on a plane which has an image height from the center of the image sensor 107 is designed to be deviated so that the center of the optical axis will pass the center of the pupil of the microlens ML.

Figure 15A:
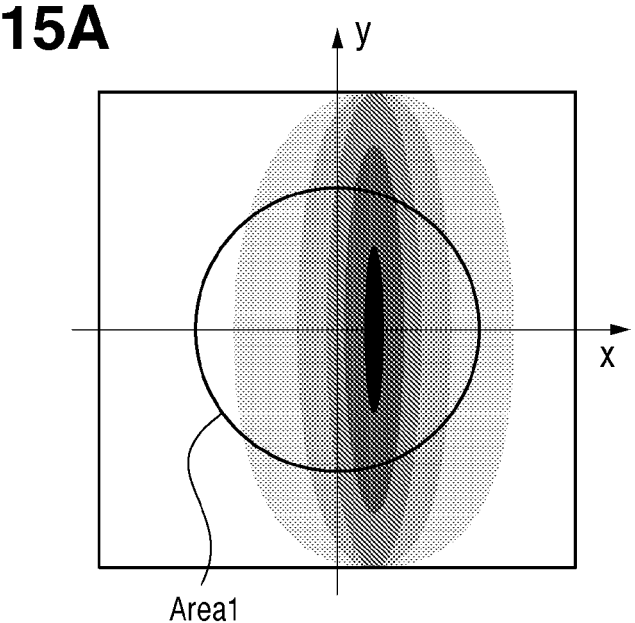
FIGS. 15A and 15B are diagrams showing vignetting on the pupil surfaces of the focus-detection pixels at the center of the image sensor.
Figure 15B:
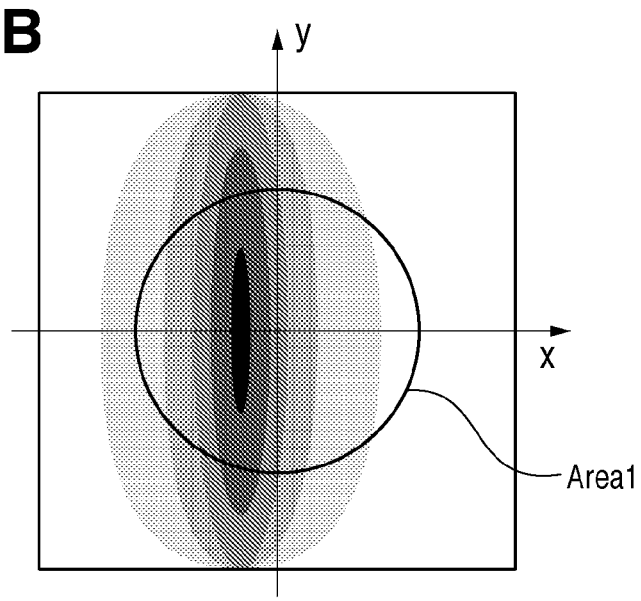
Figure 16:
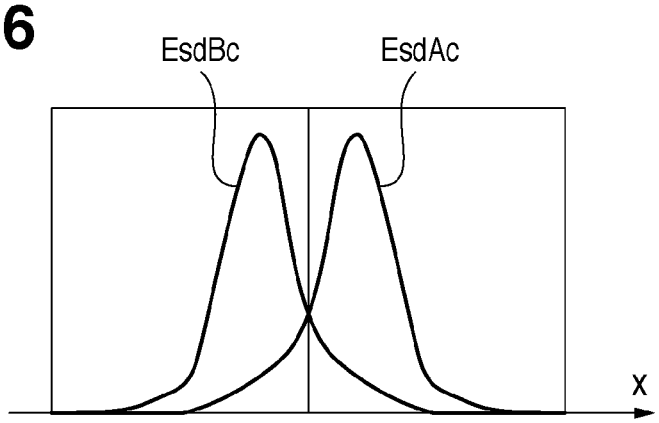
FIG. 16 is a diagram one-dimensionally showing pupil-intensity distributions of an incident luminous flux on the pupil surfaces of the focus-detection pixels at the center of the image sensor.

FIGS. 15A and 15B are diagrams showing vignetting on the pupil surfaces Me of the focus-detection pixels at the center of the image sensor 107, where FIG. 15A shows characteristics of the pixel $S_{HA}$ and FIG. 15B shows characteristics of the pixel $S_{HB}$. FIGS. 15A and 15B are obtained by superimposing FIG. 13A over FIGS. 14A and 14B. The luminous flux passing through the shape represented by Area1 enters the pixels $S_{HA}$ and $S_{HB}$ with the illustrated pupil-intensity distributions. FIG. 16 is a diagram one-dimensionally showing pupil-intensity distributions of an incident luminous flux on the pupil surfaces Me of the focus-detection pixels at the center of the image sensor 107. The abscissa corresponds to the x coordinate on the pupil surface Me and the ordinate represents intensity at each coordinate. The intensity at each x coordinate is obtained by adding the pupil intensities in the y direction in FIGS. 15A and 15B. The pupil-intensity distributions of the incident luminous flux on the pupil surfaces Me of the pixels $S_{HA}$ and $S_{HB}$ are represented by EsdAc and EsdBc, respectively. As shown in FIGS. 15A and 15B, the pupil-intensity distributions on the pupil surfaces Me of the pixels $S_{HA}$ and $S_{HB}$ are mirror images of each other. Since vignette shape is symmetric with respect to the y axis, the pupil-intensity distributions of the incident luminous flux on the pupil surfaces Me of the pixels $S_{HA}$ and $S_{HB}$ are also mirror images of each other.

FIGS. 17A and 17B are diagrams showing vignetting on the pupil surfaces Me of pixels which have an image height from the center of the image sensor 107, where FIG. 17A shows characteristics of the pixel $S_{HA}$ and FIG. 17B shows characteristics of the pixel $S_{HB}$. FIGS. 17A and 17B are obtained by superimposing FIG. 13B over FIGS. 14A and 14B. The luminous flux passing through the shape represented by Area2 enters the pixels $S_{HA}$ and $S_{HB}$ with the illustrated pupil-intensity distributions. FIG. 18 is a diagram one-dimensionally showing pupil-intensity distributions of an incident luminous flux on the pupil surfaces Me of the pixels which have an image height from the center of the image sensor 107. The abscissa corresponds to the x coordinate on the pupil surface Me and the ordinate represents intensity at each coordinate. The intensity at each x coordinate is obtained by adding the pupil intensities in the y direction in FIGS. 17A and 17B, where the addition is performed in a direction orthogonal to the pupil separation direction. In FIG. 18, the pupil-intensity distributions of the incident luminous flux on the pupil surfaces Me of the pixels $S_{HA}$ and $S_{HE}$ are represented by EsdAh and EsdBh, respectively. The pupil-intensity distributions on the pupil surfaces Me of the pixels $S_{HA}$ and $S_{HE}$ are mirror images of each other. However since vignette shape is asymmetric with respect to the y axis, the pupil-intensity distributions EsdAh and EsdBh of the incident luminous flux on the pupil surfaces Me of the pixels $S_{HA}$ and $S_{HB}$ are not mirror images of each other.

As described above, the defocus amount of a subject image is detected by detecting the relative position of images A and B, which are subject images acquired, respectively, from the pixel $S_{HA}$ group and pixel $S_{HE}$ group arranged regularly in the x direction. If light distribution of a subject is f(x, y) and light distribution of a subject image is g(x, y), $$g(x, y) = \int_{-\infty}^{\infty} \int_{-\infty}^{\infty} f(x-a, y-b)h(a, b)dadb \quad (1)$$

Thus, a relationship given by the convolution holds, where h (x, y) is a transfer function called a point spread function which represents a degrading state of the subject in an image forming system. Thus, to find a pair of subject images used for focus detection, it is necessary to find the point spread function. In the phase-difference focus detection, the phase difference between a pair of subject images is detected by paying attention to a one-dimentional direction of the images. Therefore, an image system related to focus detection can be evaluated using a line spread function (line spread function), which is a linear function instead of using the point spread function.

Thus, by rewriting the light distribution of the subject as f(x), and the light distribution of the subject image as g(x), Equation (1) above can be rewritten as follows using a line spread function L(a):

$$g(x) = \int_{-\infty}^{\infty} f(x-a)L(a)da \quad (2)$$

Thus, under arbitrary defocus condition, a pair of line spread functions generated by luminous fluxes which pass different pupil areas in a phase shift direction are determined using Equation (2) above. Consequently, a pair of subject images can be found. Once a pair of subject images are found, a base length can be determined from distance between centers of gravity of the subject images, and the defocus amount can be calculated based on the amount of image deviation between the pair of subject images and on the base length. The base length can be determined using Equations (3) to (5) below. Let the centers of gravity of the subject images be GA and GB and let the base length be G, then $$G_A = \frac{\int_{-\infty}^{\infty} x \cdot L_A(x)dx}{\int_{-\infty}^{\infty} L_A(x)dx} \quad (3)$$

$$G_B = \frac{\int_{-\infty}^{\infty} x \cdot L_B(x)dx}{\int_{-\infty}^{\infty} L_B(x)dx} \quad (4)$$

Base length $G = |G_A - G_B| \quad (5)$

An intensity distribution of a point image formed on an image plane by light emitted from a point light source and passes an exit pupil of an optical system, that is, a so-called point spread function, is considered to be a reduced projection of an exit pupil shape on the image plane. Similarly, a line spread function can be considered to be the exit pupil shape in the one-dimensional direction, that is, the exit pupil shape integrated in the one-dimensional direction and formed in a reduced form on the image plane via the microlens ML.

Thus, it can be considered that the line spread function corresponds to the pupil-intensity distributions shown in FIG. 16 or FIG. 18, which are reduced along the abscissa and expanded along the ordinate when the amount of defocus is small, and expanded along the abscissa and reduced along the ordinate when the amount of defocus is large.

That is, as shown in FIG. 18, when the pupil-intensity distributions of the incident luminous flux on the pupil surfaces Me of the pixels $S_{HA}$ and $S_{HB}$ are not symmetric with respect to the optical axis, agreement between subject image A and subject image B is low and so is detection accuracy of the amount of defocus. In order to increase the detection accuracy of the defocus amount, it is useful to correct the asymmetry between subject image A and subject image B, and thereby improve the agreement between the images. Next, a method for correcting asymmetry of subject images will be described.

As described above, the asymmetry between subject image A and subject image B occurs when pupil-intensity distributions, asymmetric between the pixels $S_{HA}$ and $S_{HB}$, are convoluted. FIGS. 19A to 19G are conceptual diagrams illustrating a filtering process used to solve asymmetry of subject images. In FIGS. 19A to 19G, the abscissa corresponds to the x coordinate of a focusing field and the ordinate represents luminance. In FIG. 19A, the light distribution of the subject is denoted by Obj. In FIGS. 19B and 19C, line images on AF pupils of the pixels $S_{HA}$ and $S_{HE}$ are denoted by EsdAx and EsdBx. FIGS. 19D and 19E show subject image A (ImgA) and subject image B (ImgB), respectively, when defocused, where the subject image A (ImgA) is obtained by convolution of the light distribution Obj of the subject and line image EsdAx while the subject image B (ImgB) is obtained by convolution of the light distribution Obj of the subject and line image EsdBx. FIGS. 19F and 19G show a corrected image ReImgA and a corrected image ReImgB, respectively, where the corrected image ReImgA is obtained by convoluting the subject image A (ImgA) and the line image EsdBx of image B while the corrected image ReImgB is obtained by convoluting thesubject image B (ImgB) and the line image EsdAx of image A. As can be seen from FIGS. 19F and 19G, the corrected images have the same shape. Now, principles as to why corrected images have the same shape will be described.

To begin with, subject image A (ImgA) is obtained using Equation (2) described above.

$$g(x) = \int_{-\infty}^{\infty} f(x-a)L(a)da \quad (2)$$

A corrected image ReImgA(k(x)) is determined by convolution of resulting subject image A (ImgA) and the line image EsdBx as follows:

$$K(x) = \int_{-\infty}^{\infty} g(x-b)L_B(b)db \quad (6)$$
$$= \int_{-\infty}^{\infty}\int_{-\infty}^{\infty} f(x-a-b)L_A(a)da L_B(b)db$$
$$= \int_{-\infty}^{\infty}\int_{-\infty}^{\infty} f(x-a-b)L_A(a)L_B(b)dadb$$

The corrected image ReImgB is calculated similarly as follows:

$$k(x) = \int_{-\infty}^{\infty}\int_{-\infty}^{\infty} f(x-a-b)L_A(a)L_B(b)dadb \quad (7)$$

ReImgA and ReImgB obtained using Equations (6) and (7) above are equal.

Figure 20A:
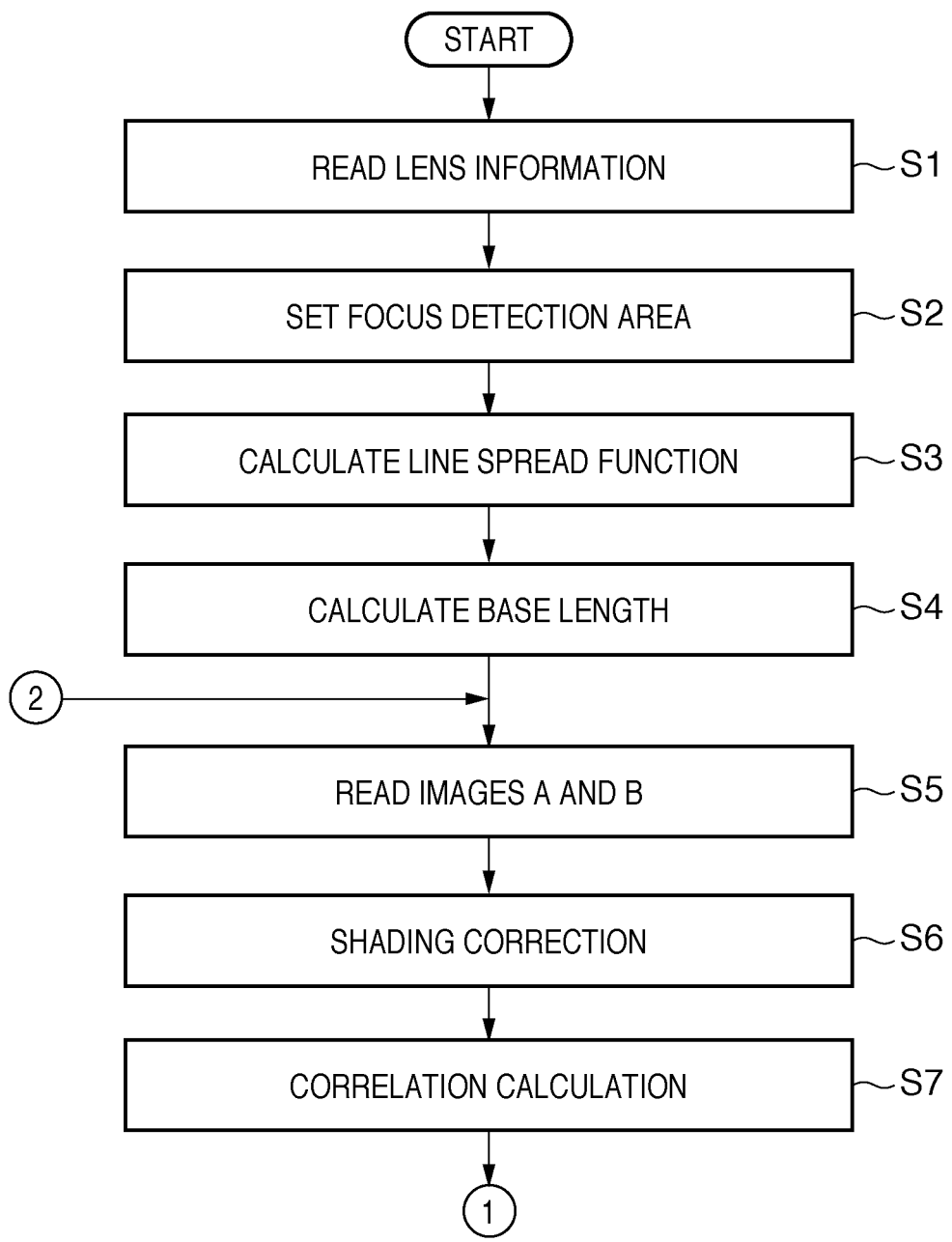
FIGS. 20A and 20B are flow charts showing a focus detection process according to the embodiment of the present invention.
Figure 20B:
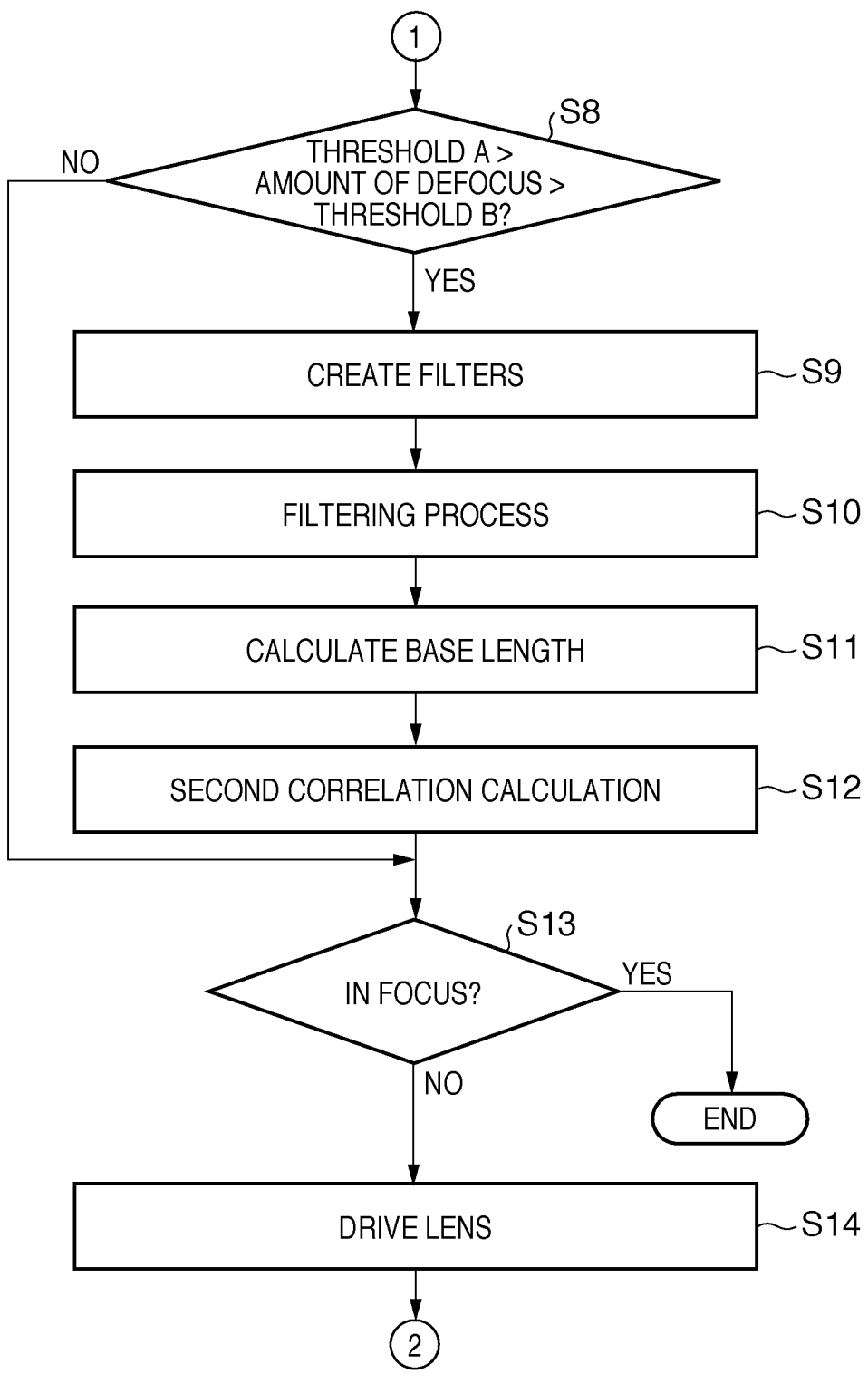

Next, a flow of a focus detection process according to the present embodiment will be described with reference to a flowchart in FIGS. 20A and 20B. The operation of the flowchart in FIGS. 20A and 20B is performed by the CPU 121.

In step S1, the CPU 121 reads out lens information to check vignetting state. In step S2, the CPU 121 reads out a focus-detection area set by the user, and then goes to step S3.

In step S3, the CPU 121 reads the pupil intensity distribution of each focus detection pixel out of the ROM of the CPU 121 and calculates the line spread function using the acquired information in conjunction with the vignetting information obtained in step S1. In step S4, the CPU 121 calculates the center of gravity of the line spread function obtained in step S3 and determines the base length. Then, the CPU 121 goes to step S5.

Next, in step S5, the CPU 121 reads image signals from focus-detection pixels in the focus-detection area and forms subject image A and subject image B. In step S6, the CPU 121 performs shading correction by predicting shading of subject image A and subject image B formed in step S5 based on the line spread function obtained in step S3. After the shading correction, the CPU 121 goes to step S7.

In step S7, the CPU 121 determines an amount of image deviation by a known correlation calculation method using subject image A and subject image B subjected to the shading correction in step S6, and determines a tentative defocus amount based on the amount of image deviation in conjunction with the base length determined in step S4. Once the tentative defocus amount is calculated, the CPU 121 goes to step S8.

In step S8, the CPU 121 determines whether or not the tentative defocus amount calculated in step S7 falls within a range defined by thresholds A and B. If it is determined that the tentative defocus amount falls within the defined range, the CPU 121 goes to step S9 to perform an image correction process. On the other hand, if it is determined that the tentative defocus amount falls outside the defined range, the CPU 121 goes to step S13 without performing an image correction process. Reasons for this will be described below.

If an image correction process is performed when the amount of defocus is too large, correlation calculation becomes difficult to perform because the convolution will further blur the images. On the other hand, when the amount of defocus is small, since symmetricalness of the two images is not violated much, there is no need to correct the images. For these two reasons, it is convenient to perform image correction only when the tentative defocus amount is within a certain defocus range.

In step S9, the CPU 121 creates image correction filters. The line spread function obtained in step S3 is adjusted to suit width of image correction filters determined based on the tentative defocus amount calculated in step S7.

Figure 21A:
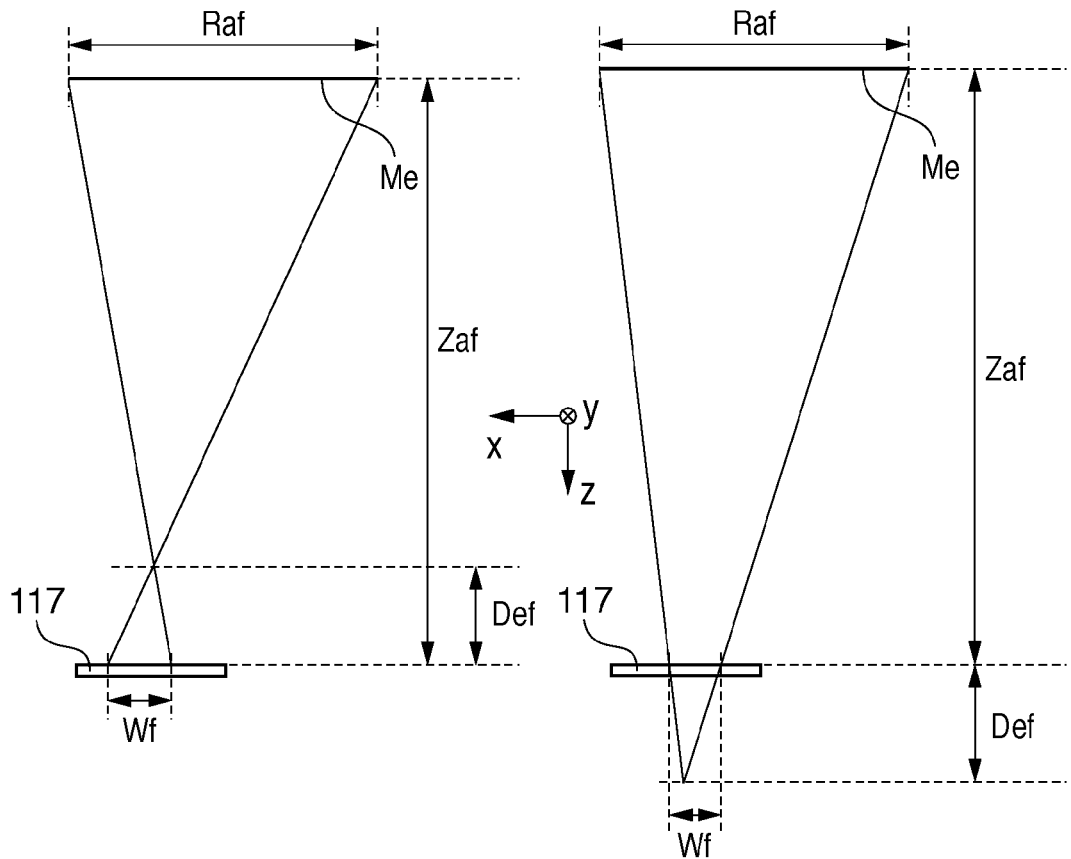
FIGS. 21A and 21B are diagrams showing a beam incident upon the image sensor in the case of defocusing.
Figure 21B:
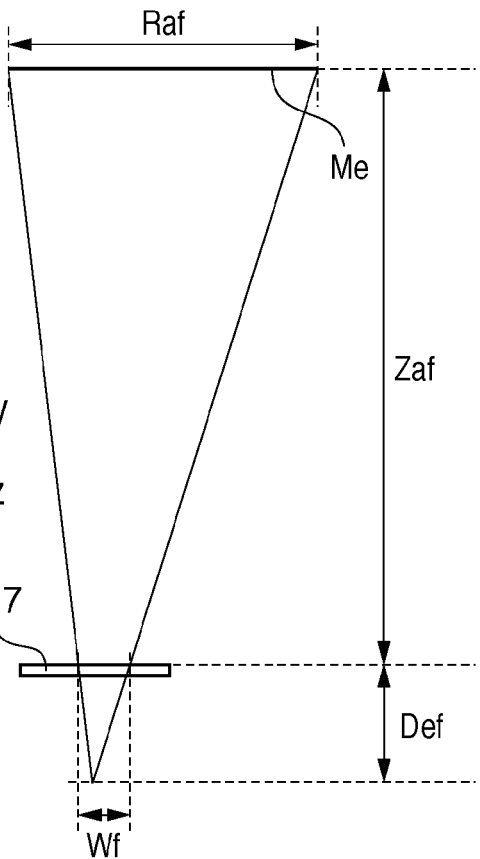
Figure 22:
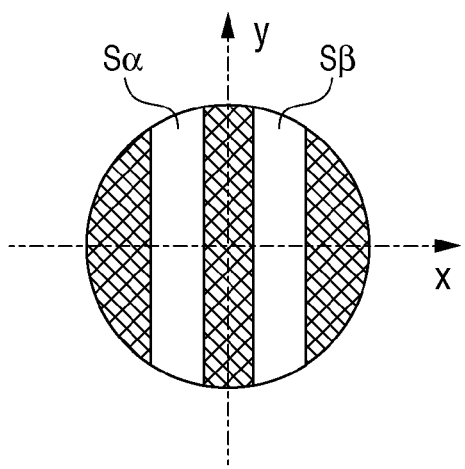
FIG. 22 is a diagram showing an exemplary distribution of received light of a conventional solid-state image sensor.

A method for determining the width of the image correction filters will be described with reference to FIGS. 21A and 21B. FIGS. 21A and 21B are diagrams showing a beam incident upon the image sensor 107 in the case of defocusing. FIG. 21A is a ray diagram in the case of front focus, where reference character Zaf denotes the distance from the surface of the image sensor 107 to the pupil surface Me, Raf denotes horizontal width which restricts the luminous flux on the pupil surface Me based on the vignetting information obtained in step S1, and Def denotes the tentative defocus amount obtained in step S7. As can be seen from FIG. 21A, the image has a spread width of Wf on the surface of the image sensor 107. Thus, considering that Def is negative in the case of front focus, Wf is obtained using the following equation:

$$Wf = \left|\frac{Raf \times Def}{Zaf + Def}\right| \quad (8)$$

Similarly, a rear-focus situation results in a relationship illustrated in FIG. 21B and consequently Equation (8) holds as in the case of front focus. Thus, Wf obtained from Equation (8) gives the width of the image correction filters.

Next, the CPU 121 increases a gain of the shorter filter so that the image correction filters will have the same height. This is because shading correction has been applied to subject image A and subject image B in the first correlation calculation in step S6.

Next, the CPU 121 moves waveforms to align the centers of gravity of the image correction filters of subject image A and subject image B. This is intended to limit amounts of change in the base length caused in a filtering process in the next step S10 to those caused by deformation of subject image A and subject image B corrected in the filtering process.

In step S10, the CPU 121 performs the convolution of the image correction filters obtained in step S9 and the subject images, and thereby calculates corrected subject images. Then, the CPU 121 goes to step S11. In step S11, the CPU 121 calculates the base length anew using the line spread function obtained in step S3. First, the CPU 121 moves a line image (hereinafter referred to as line image A) corresponding to subject image A and a line image (hereinafter referred to as line image B) corresponding to subject image B in such a way as to bring their centers of gravity into coincidence. If the moved line image A and line image B are designated as line image A0 and line image B0, a corrected line image A is obtained by convoluting the line image A and the line image B0 while a corrected line image B is obtained by convoluting the line image B and the line image A0. The CPU 121 calculates corrected base length from distance between the centers of gravity of the corrected line image A and corrected line image B. This is given by the following equation. If the corrected line image A is $M_A(x)$, the line image A is $L_A(x)$, and the line image B0 is $L_B'(x)$, an equation used to determine the corrected line image A is given by:

$$M_A(x) = \int_{-\infty}^{\infty} L_A(x) \cdot L_B'(x-b) db \quad (9)$$

Thus, if the center of gravity of the corrected line image A is denoted by $G_A'$, $$G_A' = \frac{\int_{-\infty}^{\infty} x \cdot M_A(x) dx}{\int_{-\infty}^{\infty} M_A(x) dx} \quad (10)$$

Similarly, if the corrected line image B is $M_B(x)$, the line image B is $L_B(x)$, and the line image A0 is $L_A'(x)$, an equation used to determine the corrected line image B is given by:

$$M_B(x) = \int_{-\infty}^{\infty} L_B(x) \cdot L_A'(x-a) da \quad (11)$$

Thus, if the center of gravity of the corrected line image B is denoted by $G_B'$, $$G_B' = \frac{\int_{-\infty}^{\infty} x \cdot M_B(x) dx}{\int_{-\infty}^{\infty} M_B(x) dx} \quad (12)$$

Thus, if the base length to be determined is G', $$G' = G_A' - G_B' \quad (13)$$

Once the base length described above is calculated, the CPU 121 goes to step S12.

In step S12, the CPU 121 determines the amount of image deviation between the two images by a known correlation calculation method using the corrected subject images formed in step S10, detects focus state, and determines the defocus amount based on the amount of image deviation in conjunction with the corrected base length determined in step S11. Once the amount of defocus is determined, the CPU 121 goes to step S13.

In step S13, based on the calculated amount of defocus, the CPU 121 determines whether the subject is in focus. If it is not determined that the subject is in focus, the CPU 121 goes to step S14 to move the third lens group 105 forward or backward based on results of the defocus calculation. Then, the CPU 121 returns to step S5.

On the other hand, if it is determined that the subject is in focus, the CPU 121 finishes the series of focus detection process steps.

The above configuration enables restoring images according to the vignetting state of a luminous flux and thereby improve focusing accuracy.

Incidentally, although a known correlation calculation method based on image deviation is used in the present embodiment, similar results can be obtained using another method. Also, in the present embodiment, the image correction process is performed using correction filters whose heights are adjusted to the line images corresponding to two subject images subjected to shading correction. However, image correction may be performed by convoluting the subject images before shading correction using correction filters whose heights are not adjusted. Furthermore, although in the present embodiment, the necessity for the image correction process is determined depending on a defocus range, focusing accuracy is expected to be improved even when an image correction process is performed throughout the range of defocus.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer, for example, via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-292609, filed on Nov. 14, 2008 which is hereby incorporated by reference herein in its entirety.

The invention claimed is:

1. A focus detection apparatus comprising:
an image sensing unit configured to have a first pixel group which receives a luminous flux passing a first pupil area of an imaging optical system which forms a subject image, and a second pixel group which receives a luminous flux passing a second pupil area different from the first pupil area;
a storage unit configured to store a first distribution function corresponding to the first pupil area, and a second distribution function corresponding to the second pupil area;
a calculation unit configured to generate a first image signal by performing calculations on a first subject image, obtained from the first pixel group, using the second distribution function, and generate a second image signal by performing calculations on a second subject image, obtained from the second pixel group, using the first distribution function; and a focus state detection unit configured to detect a focus state of the imaging optical system based on the first image signal and the second image signal generated by said calculation unit, wherein said calculation unit deforms the first distribution function and the second distribution function based on the phase difference obtained from the first subject image and the second subject image.

2. The focus detection apparatus according to claim 1, wherein the first image signal is generated by convoluting the first subject image obtained from the first pixel group with the second distribution function and the second image signal is generated by convoluting the second subject image obtained from the second pixel group with the first distribution function.

3. The focus detection apparatus according to claim 1, further comprising a determination unit configured to determine whether to generate the first image signal and the second image signal using said calculation unit based on the phase difference obtained from the first subject image and the second subject image.

4. The focus detection apparatus according to claim 1, wherein the first distribution function and the second distribution function are line spread functions.

5. An image sensing apparatus comprising:
an imaging optical system which forms a subject image; and
the focus detection apparatus according to claim 1.

6. A focus detection method comprising;
an image sensing step of reading a first subject image from a first pixel group which receives a luminous flux passing a first pupil area of an imaging optical system which forms a subject image, and reading a second subject image from a second pixel group which receives a luminous flux passing a second pupil area different from the first pupil area, the first pixel group and the second pixel group being included in image sensing means;
an acquisition step of acquiring a first distribution function corresponding to the first pupil area, and a second distribution function corresponding to the second pupil area;
a calculation step of generating a first image signal by performing calculations on the first subject image using the second distribution function and generating a second image signal by performing calculations on the second subject image using the first distribution function; and
a focus state detection step of detecting a focus state of the imaging optical system based on the first image signal and the second image signal generated in said calculation step, wherein said calculation step deforms the first distribution function and the second distribution function based on the phase difference obtained from the first subject image and the second subject image.

7. A non-transitory computer-readable storage medium storing a program which is executable by a computer, the program having a program code for realizing the focus detection method according to claim 6.

8. A focus detection apparatus comprising:
image sensing means having a first pixel group which receives a luminous flux passing a first pupil area of an imaging optical system which forms a subject image, and a second pixel group which receives a luminous flux passing a second pupil area different from the first pupil area;
storage means storing a first distribution function corresponding to the first pupil area, and a second distribution function corresponding to the second pupil area;
calculation means generating a first image signal by performing calculations on a first subject image, obtained from the first pixel group, using the second distribution function, and generating a second image signal by performing calculations on a second subject image, obtained from the second pixel group, using the first distribution function; and
focus state detection means detecting a focus state of the imaging optical system based on the first image signal and the second image signal generated by said calculation means;
wherein said calculation means deforms the first distribution function and the second distribution function based on the phase difference obtained from the first subject image and the second subject image.

9. The focus detection apparatus according to claim 8, wherein the first image signal is generated by convoluting the first subject image obtained from the first pixel group with the second distribution function and the second image signal is generated by convoluting the second subject image obtained from the second pixel group with the first distribution function.

10. The focus detection apparatus according to claim 8, further comprising determination means determining whether to generate the first image signal and the second image signal using said calculation means based on the phase difference obtained from the first subject image and the second subject image.

11. The focus detection apparatus according to claim 8, wherein the first distribution function and the second distribution function are line spread functions.

12. An image sensing apparatus comprising:
an imaging optical system which forms a subject image; and
the focus detection apparatus according to claim 8.

* * * * *